(12) United States Patent
Kanda et al.

(10) Patent No.: US 6,594,102 B1
(45) Date of Patent: Jul. 15, 2003

(54) APPARATUS AND METHOD FOR RETRACTING THE HEAD ON POWER DOWN IN A DISK DRIVE

(75) Inventors: Hiroyuki Kanda, Hanno (JP); Koji Osafune, Tokyo (JP); Tatsuharu Kusumoto, Tokyo (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 09/343,673

(22) Filed: Jun. 30, 1999

(30) Foreign Application Priority Data

Jul. 1, 1998 (JP) .......................................... 10-186461
Sep. 9, 1998 (JP) .......................................... 10-255517

(51) Int. Cl.[7] ............................................. G11B 21/02
(52) U.S. Cl. ...................................................... 360/75
(58) Field of Search ........................................... 360/75

(56) References Cited

U.S. PATENT DOCUMENTS

| | | | | |
|---|---|---|---|---|
| 4,103,338 A | * | 7/1978 | Cizmic et al. | 714/42 |
| 4,786,995 A | * | 11/1988 | Stupeck et al. | 360/75 |
| 5,486,957 A | | 1/1996 | Albrecht | 360/75 |
| 5,602,691 A | * | 2/1997 | Iwabuchi | 360/75 |
| 5,831,786 A | * | 11/1998 | Boutaghou et al. | 360/75 |
| 5,889,629 A | * | 3/1999 | Patton, III | 360/75 |

FOREIGN PATENT DOCUMENTS

| | | | | |
|---|---|---|---|---|
| JP | 9-73744 | 3/1997 | | G11B/21/12 |
| JP | 9-213035 | 8/1997 | | G11B/21/12 |

* cited by examiner

Primary Examiner—David Hudspeth
Assistant Examiner—Mitchell Slavitt
(74) Attorney, Agent, or Firm—Gray Cary Ware & Freidenrich LLP

(57) ABSTRACT

Disclosed herein is a disk drive that can retract the head to a retract position by using a reserve power supply, when the supply of power from the main power supply is interrupted. The disk drive comprises a CPU, a control capacitor, an unload circuit, a reserve power supply, and a VCM. While the disk drive is operating normally, the CPU performs servo control, calculates a retract distance from the position of the head and determines a control value corresponding to the retract distance, by using the main power supply. The CPU converts the control value to a control voltage, which is held in the control capacitor. When the supply of power from the main power supply is interrupted, the unload circuit supplies a drive current set by the control voltage held in the control capacitor, from the reserve power supply to the VCM. The VCM moves the head to the retract position at an appropriate speed.

8 Claims, 12 Drawing Sheets

FIG.6A OUTPUT FROM CPU 22
FIG.6B OUTPUT FROM D/A CONVERTER 218
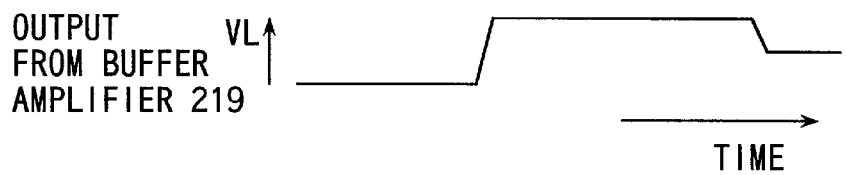
FIG.6C OUTPUT FROM BUFFER AMPLIFIER 219
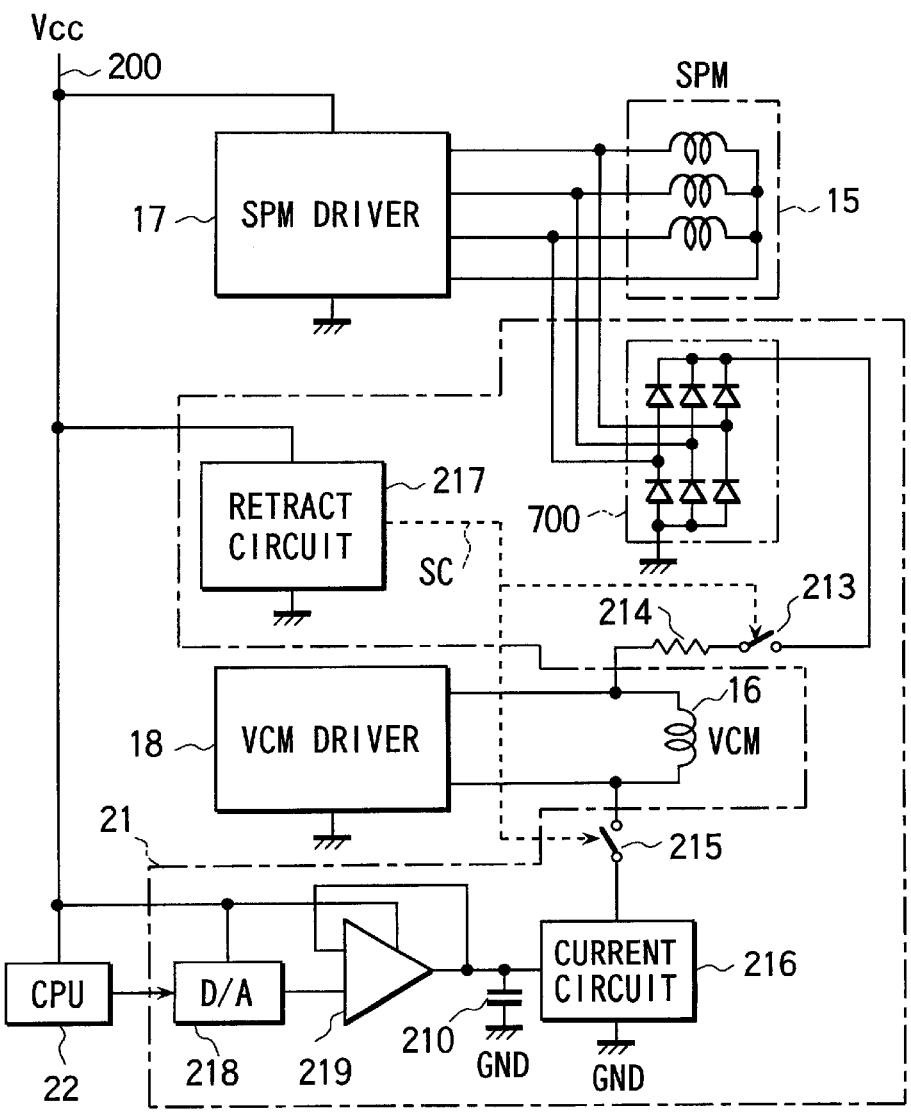
FIG.7

APPARATUS AND METHOD FOR RETRACTING THE HEAD ON POWER DOWN IN A DISK DRIVE

BACKGROUND OF THE INVENTION

The present invention relates to a disk drive in which a disk is used as data-recording medium and the head writes data on the disk and read data from the disk. More particularly, the invention relates to a disk drive in which the head is retracted to a retract position.

A hard disk drive has a head and a head-retracting mechanism. The head is a slider having a read/write element, designed to write data on a disk and read data therefrom. The head-retracting mechanism retracts the head to a prescribed retract position when the disk is stopped and the head stops writing data on or reading data from the disk.

In a CSS (Contact Start and Stop) disk drive, the retract position is provided in the CSS area located at the innermost track of the disk. Thus, the head is retracted to the CSS area when the disk is stopped. The head, thus retracted, contacts the CSS area and remains in standby state. The head slides on the surface of the disk when the spindle motor provided in the disk drive starts rotating the disk and also when the spindle motor stops rotating the disk. The head may damage the disk, leaving "scars" or the like on the surface of the disk. Therefore, the CSS area cannot be used as a data area, and is provided in a retract zone (also known as "dedicated landing zone"), which is distinct from the data zone. When the CSS disk drive is turned on, the spindle motor starts rotating the disk. As the spindle motor rotates the disk at high speed, an air bearing develops, which makes the head float above the disk. The head is moved from the retract zone to the data zone and positioned at a target position (i.e., a target track which the head will access to).

When the CSS disk drive is turned off or when a host system gives a command to the CSS disk drive to stop the spindle motor, the head is retracted to the CSS area and the spindle motor is stopped thereafter. When the head reaches the CSS area, the actuator supporting the head abuts on a stopper. The head is thereby prevented from jumping out of the CSS area. A voice coil motor (VCM) drives the actuator in the radial direction of the disk, moving the head in the same direction. The VCM so operates as it is supplied with a drive current from a VCM driver, which is controlled by the microprocessor (CPU) incorporated in the CSS disk drive.

The supply of power to the CSS disk drive may be abruptly stopped while the head is writing data on the disk or reading data therefrom. If this happens, the head must be retracted to the CSS area before the spindle motor stops. Unless the head is retracted so, it will collides with the disk when the disk creases to rotate while the head is floating above the data zone of the disk. Once the supply of power to the CSS disk drive is stopped, the VCM driver no longer supplies a drive current to the VCM. The actuator can not move the head at all.

In view of this, a new type of an HDD (Hard Disk Drive) has been developed. This HDD incorporates a reserve power supply having a capacitor (or a rechargeable battery). The capacitor is charged while the drive is being driven with the power supply (main power supply). When the main power supply is interrupted, power is supplied from the reserve power supply to the VCM, whereby the head is retraced. Another type of a disk drive has been developed, which has no reserve power supplies and in which the back electromotive force (EMF) generated as the spindle motor is driven is used to retract, the head.

Disk drives, known as "head loading/unloading type," have been developed. Each disk drive of this type has a head loading/unloading mechanism. The head loading/unloading mechanism retracts the head to the retract position, unloading the head, whenever the disk stops rotating. At the retract position, a ramp is provided and supports the suspension of the actuator. When the disk acquires a normal rotation speed after it has started rotating, the head loading/unloading mechanism moves over the disk, loading the head. The mechanism prevents the head from contacting the disk, thus maintaining the surface smoothness of the disk and reducing the flying height of the head. This helps enhance the recording density of the disk.

As shown in FIG. 2, the head loading/unloading mechanism has a ramp (retract position) 14 located at the circumference of the disk 11. To unload the head, the actuator 13 is driven, moving the suspension 131. The head (slider) 12 supported by the suspension 131 is thereby moved to the ramp 14. As a result, the distal end of the suspension 131, to which a tab (not shown) is attached, then slides onto the inclined surface 141 of the ramp 14. The head 12 is thereby lifted above the surface of the disk 11. A stopper (not shown) stops the actuator 13 at a prescribed position outside the circumference of the disk 11.

During the normal operation of the disk drive, that is, while the disk drive is being supplied with power, the CPU incorporated in the disk drive controls, with high precision, the speed with which the actuator 13 is moved to unload the head 12. This is necessary, because if the speed is too high, the impact the suspension 131 exerts on the ramp 14 when it contacts the inclined surface 141 will increase, inevitably increasing the possibility that the disk 11 or the head 12, or both, are damaged.

The supply of power to the disk drive may be interrupted before the head 12 is unloaded (or retracted). If this happens, the disk 12 is stopped in the same way as in the CSS disk drive described above. Consequently, the head 12 collides with the disk 11. In order to prevent the collision, the disk drive of head loading/unloading type has a reserve power supply having a capacitor, just like the CSS disk drive. When the supply of power from the main power supply to the disk drive is interrupted, power is supplied from the reserve power supply to the VCM, which drives the actuator 13, thereby unloading, (retracting) the head 12.

With either the CSS disk drive or the head loading/unloading disk drive, it is possible to retract the head at an abrupt interruption of the supply of power, by means of the reserve power supply (including a back EME). Either disk drive is, however, disadvantageous in the following respects.

In a CSS disk drive containing a disk having a diameter of 2.5 inches, the reserve power supply supplies power to the VCM when the supply of power from the main power supply interrupted, as has been mentioned above. The head is thereby retracted, thanks to the use of the reserve power supply. The time required to retract the head from the data zone of the disk to the CSS area thereof is tens of milliseconds at most, even if the head is located at the outermost track, i.e., the remotest position from the CSS area. While the head is retracted, an almost constant current is supplied to the VCM from the reserve power supply. The value of the current depends on the capacitance of the reserve power supply. Driven by the VCM, the actuator moves the head. The speed at which the head is moved is proportional to the time required to retract the head from the data zone to the CSS area and is proportional to the square root of the distance the head is moved.

Assume that the CSS area, the innermost track and the outermost track have a radius of 15 mm, a radium of 16 mm and a radius of 31 mm, respectively. Then, the speed with which the actuator collides with the stopper when the head is retracted to the CSS area from the innermost track is about four times the speed with which the actuator collides with the stopper when the heat is retracted to the CSS area from the innermost track. Nonetheless, the speed with which the actuator collides with the stopper can be reduced to decrease the impact, because the actuator is driven with a relatively small current in the CSS disk drive. This speed should be of such a value as will cause the actuator to generate a force greater than the offset force of the FPC (Flexible Printed Circuit) board, which has terminals, connected to the head. The speed can be set at any desired value, only if the VCM-driving current is controlled by connecting a resistor in series the VCM. A head amplifier circuit is mounted on the FPC board, to amplify the signals the head reproduces from the disk. To accomplish stable operation of the CSS disk drive, it is desirable that the supply a smaller current to the VCM to retract the head from an outer track, than to retract the head from an inner track.

The two preceding paragraphs hold true of a head loading/ unloading disk drive, too. In the head loading/unloading disk drive, however, the retract position (i.e., ramp 14) is located outside the circumference of the disk 11. Therefore, the speed with which the distal end of the suspension 131 contacts the inclined surface 141 of the ramp 14 when the head 12 is retracted from the innermost track is about four times the speed with which the distal end of the suspension contacts the surface 141 when the head 12 is retracted from the outermost track.

The friction generated while the distal end of the suspension 131 is sliding on the inclined surface 141 of the ramp 14 is greater than in the CSS disk drive. A large current must therefore be supplied to the VCM to retract the head 12 from an inner track of the disk, as well. In the head loading/ unloading disk drive, the reserve power supply needs to have large capacitance to supply a relatively large current to the VCM when the supply of power from the main power supply is interrupted. However, the larger the current supplied to the VCM, the higher the speed with which the suspension 131 collides with the inclined surface 141 when the head 12 is retracted from the innermost track. The higher the speed, the greater the possibility that the suspension damages the head 12 or the disk 11, or both.

BRIEF SUMMARY OF THE INVENTION

The object of the invention is to provide an apparatus and method which can reliably move the head in a disk drive, to a retract position at an appropriate speed, when the supply of power to the disk drive is interrupted.

To attain the object, an apparatus for retracting a head on power down in a disk drive, which comprises: an apparatus for retracting a head from a disk surface on power down in a disk drive, comprising: actuator means supporting head and designed to move the head form a retraction position to a prescribed area on the disk; reserve power means provided apart from a main power supply to the disk drive, for supplying a drive current to the actuator means when supply of power from the main power supply is interrupted; retract means for calculating a distance for which the head is to be moved to the retract position, from a present position of the head, and for determining a control value corresponding to the distance calculated; and control means for controlling the drive current supplied from the reserve power means to move the head to the retract position, on the basis of the control value determined by the retract means.

The actuator means has a voice coil motor (VCM) and moves the head at the speed corresponding to the drive current supplied to the VCM. The retract means calculates the distance the head should be moved to the retract position by using the reserve power means when the supply of power from the main power supply is interrupted. Further, the retract means determines the control value for setting a drive current for the VCM, from the distance it has calculated. The control means controls the drive current supplied to the VCM from the reverse power means, in accordance with the control value determined by the retract means.

When the supply of power from the main power supply is abruptly interrupted while the head remains above the disk, the head can be moved from the disk surface to the retract position by means of the reserve power means. The control means calculates the distance the head must be moved to the retract position and sets a drive current for the VCM, from the distance calculated. Hence, the head can be retracted at an appropriate speed, not at an excessively high speed. In short, the head is moved to the retract position, such as a ramp, at an appropriate speed, not merely by using the reserve power means, at the interruption of the supply of power from the main power supply. Thus, the head can be reliably retracted, not being damaged or damaging the disk.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 6A to 6C are a timing chart illustrating when a control voltage is applied in the first embodiment of the present invention;

FIG. 7 is a block diagram showing the first modification of the unloading circuit provided in the first embodiment of the invention;.

DETAILED DESCRIPTION OF THE INVENTION

The first embodiment of the present invention will be described with reference to some of the accompanying drawings. The first embodiment is a head-retracting apparatus for use in a head loading/unloading disk drive.

Disk Drive

Figure 1:
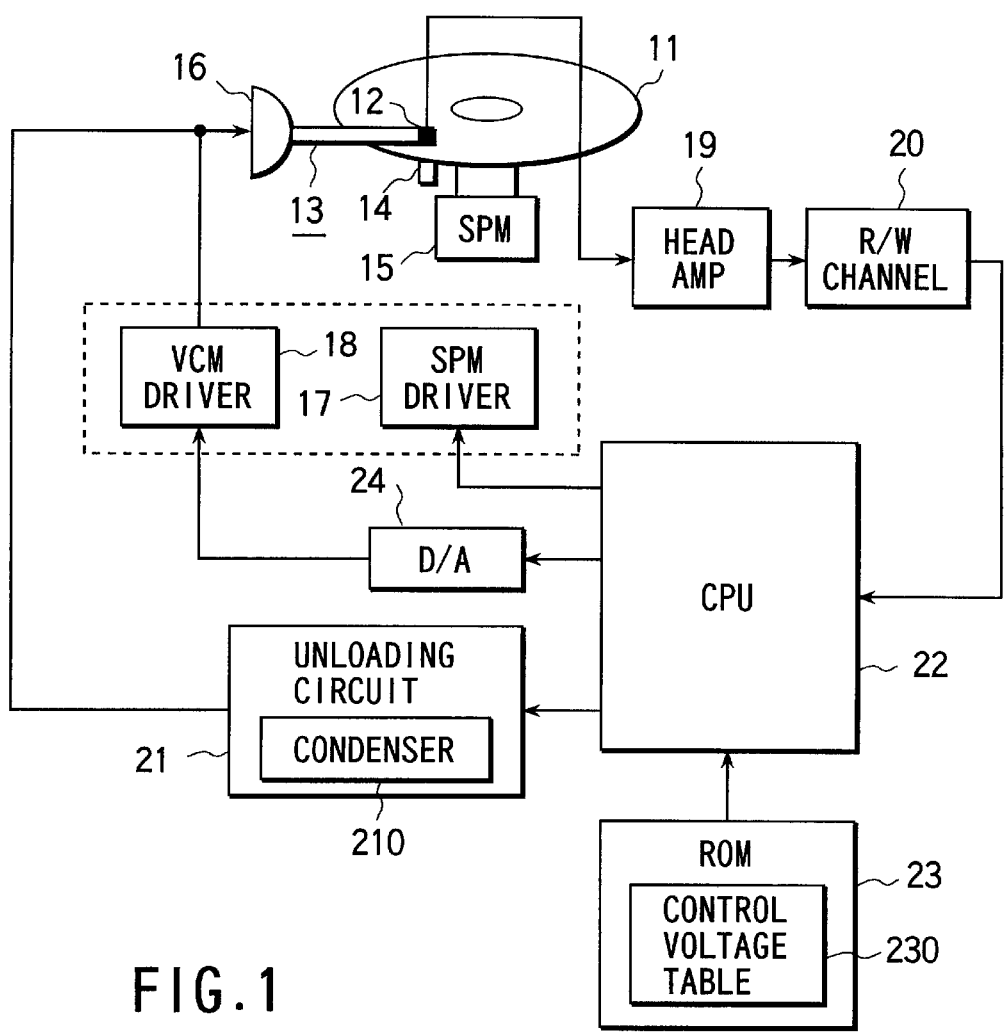
FIG. 1 is a block diagram showing the major components of a disk drive incorporating the first embodiment of the invention.

As shown in FIG. 1, the head loading/unloading disk drive has a disk 11, a pair of heads 12 (only one shown), and a pair of actuators 13. The disks 12 are data-recording media. The heads 12 comprise a slider and a read/write element each. The heads 12 are located at the two surfaces of the disk 12, respectively, to read data from the disk 11 and write data on the disk 11. The actuators 13 support the heads 12, respectively. The disk head loading/unloading drive may have additional disks. In this case, additional pairs of heads are provided, each pair for reading data from and writing data on one additional disk, and additional pairs of actuators are provided, each pair supporting two additional heads.

A number of concentric tracks are formed on either surface of the disk 11. A plurality of servo areas are arranged in each track, at regular intervals. The corresponding servo areas provided in all tracks are aligned, forming a row extending from the center of the disk 11 in the radial direction thereof. In each track, data areas (user areas) are provided among the servo areas. Each data area consists of a plurality of data sectors.

In each servo area, servo data is recorded to facilitate the positioning of the head 12 with respect to the disk 11. The servo data includes a cylinder code and burst data. The cylinder code identifies the number assigned to the cylinder containing the servo area. The burst data represents the amplitude of a waveform, which indicates the maximum position error the head can have with respect to the cylinder identified with the cylinder code.

Each head 12 is secured to the actuator 13, which is a rotary type one. The actuator 13 has a suspension holding the head 12. The actuator 13 moves over the disk 11 in the radial direction thereof when it is driven by a voice coil motor (VCM) 16 (see FIG. 2). As the actuator 13 moves so, the head 12 is positioned at a target track provided on the disk 11. A ramp 14 (retraction position) is provided outside the circumference of the disk 11, for retracting the heads 12. The ramp 14 has two inclined surfaces (see FIG. 2), each for supporting the distal end of the suspension of one actuator 13.

A spindle motor (SPM) 15 is provided to rotate the disk 11 at high speed. The SMP 15 is driven with the current supplied from an SPM driver 17. The VCM 16 is driven with the current supplied from a VCM driver 18. The VCM driver 16 and SMP driver 17 are provided in the form of a one-chip integrated circuit. A CPU 22 controls the drive currents supplied from the drivers 17 and 18 to the motors 15 and 16, respectively. The VCM 16 is driven with the current supplied from an unloading circuit 21 when the supply of power to the disk drive from the main power supply is interrupted.

Each actuator 13 positions the head 12 at the target track provided on the disk 11. The head 12, thus positioned, starts reading data from, or writing data on, the data sector which is included in the track and which has been accessed. The head 12 is connected to a head amplifier 19 that is mounted on the FPC. The head amplifier 19 amplifies the read signal the head 12 has generated. The read signal amplified is supplied from the head amplifier 19 to a read/write channel 20. The head amplifier 19 also performs a prescribed process on the write data output from the read/write channel 20. The write data processed is supplied from the channel 20 to the head 12.

The read/write channel 20 comprises an AGC (Automatic Gain Control) amplifier, a decoder circuit, an encoding circuit, and a servo circuit. The AGC amplifier maintains the read signal supplied from the head amplifier 19 at a constant level. The decoding circuit decodes the read signal to, for example, NRZ-coded data. The encoding circuit generates write data, which will be recorded on the disk 11. The servo circuit extracts servo data from the read signal.

The unloading circuit 21 supplies a drive current to the VCM 16 when the supply of power from the main power supply to the disk drive is interrupted. This drive current has a value necessary for retracting (unloading) the head 12 to the ramp 14 at a speed that accords with the position the head 12 takes at the interruption of the supply of power. The unloading circuit 21 incorporates a control capacitor 210 for holding a control voltage that determines the drive current for the VCM 16.

The CPU (Central Processing Unit) 22 controls some of the other components of the head loading/unloading disk drive, in accordance with the control program stored in a ROM 23. Among the controls the CPU 22 performs is servo control. The servo control is effected as follows. First, the CPU 22 determines the position the head 12 assumes at present with respect to the disk 11, from the servo data the read/write circuit 20 has extracted from the read signal. The CPU 22 then calculates the distance between the present position of the head 12 and the target position over the disk 11. On the basis of the distance calculated, the CPU 22 finds a control value for moving the head 12 to the target position. The CPU 22 sets the control value in the VCM driver 18.

When the host system gives the disk drive a command to the CSS disk drive to stop the SPM 14, the CPU 22 performs unloading control in order to retract (unload) the head 12 to the ramp 14. The CPU 22 also effects load control to move the head 12 from the ramp 14 to the target position over the disk 11, when the SPM 15 is driven so that the head 12 may start reading data from or writing data on the disk 11. Further, the CPU 22 activates the unloading circuit 21 to accomplish retract (unload) when the supply of power form the main power supply is abruptly interrupted. More specifically, the CPU 22 refers to the control voltage table 230 stored in the ROM 23, setting various control voltages for the respective servo areas, which accord with the distance the head 11 must be moved. Registered in the control voltage table 230 are control voltages that drive the VCM driver to move the head 12 to the ramp 14 by various retract distances.

Unloading Circuit 21

Figure 3:
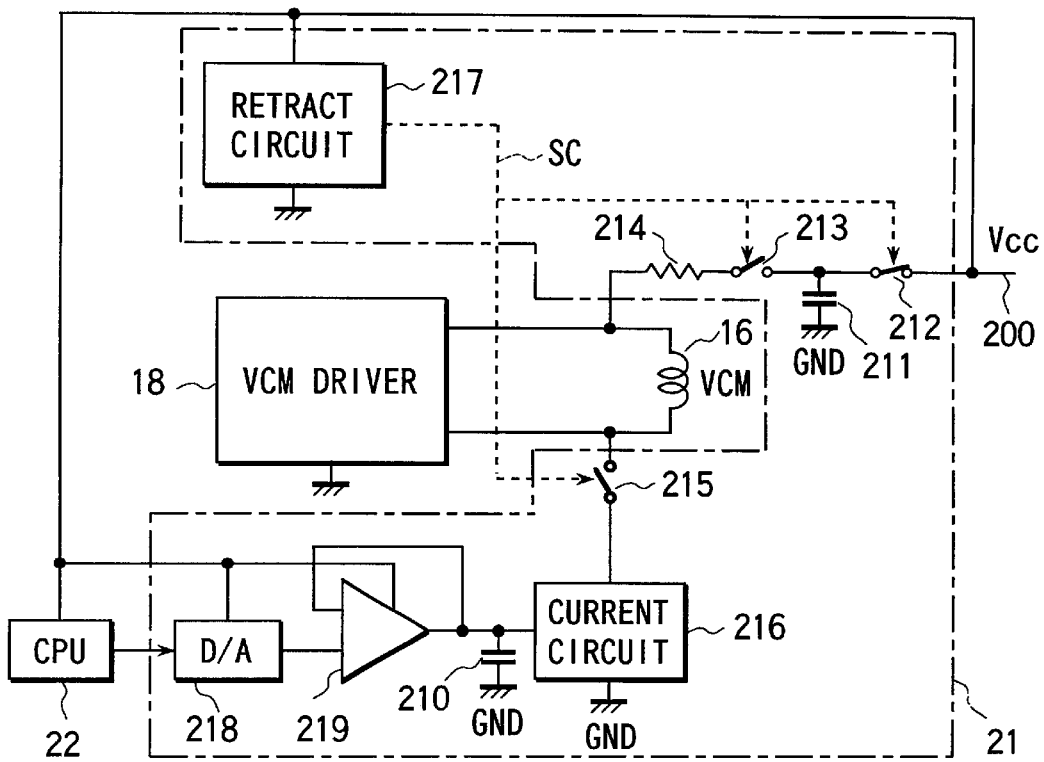
FIG. 3 is a block diagram of the unloading circuit provided in the first embodiment of the invention.

As shown in FIG. 3, the unloading circuit 21 comprises a control capacitor 210, a switch 212, a capacitor 211, a constant current circuit 216, a retract circuit 217, a D/A converter 218, and a buffer amplifier 219. The switch 212 is connected to the main power supply line 200, through which main power-supply voltage Vcc is applied. The capacitor 211 is provided as reserve power supply. The capacitor 211 is charged with the main power-supply voltage Vcc while the disk drive is normally operating. The switch 212 is a semiconductor switch comprising a FET or the like and controlled by a switch control signal SC supplied from the retract circuit 217. That is, the switch 212 remains in ON stated (closed state) during the normal operation of the head loading/unloading disk drive. The switch 212 assumes OFF state (opened state) at the interruption of the application of power-supply voltage Vcc. The switch 212 remains in the OFF state, only while receiving a high-level switch control signal SC from the retract circuit 217.

The capacitor 211, which is used as reserve power supply, is connected in series to one end of the coil of the VCM 16, by a switch 213 and a current-limiting resistor 214. A switch 215 and the constant current circuit 216 are connected in series between the ground GND and the other end of the coil of the VCM 16. The switches 213 and 215 are semiconductor switches such as FETs or the like and are turned on or off by the switch control signal SC supplied from the retract circuit 217. More precisely, the switches 213 and 215 are turned off (opened) while the disk drive is operating normally (that is, while the disk drive is receiving power from the main power supply). When the supply of power from the man power supply is interrupted, the switches 213 and 215 are turned on (closed). They remain off only while the switch control signal SC remains at high level.

The constant current circuit 216 supplies a drive current to the VCN 16 as the capacitor 211 (i.e., the reserve power supply) is discharged. This drive voltage is determined by the voltage that is built in the control capacitor 210 at the interruption of the application of power-supply voltage Vcc. The retract circuit 217 monitors the power-supply voltage Vcc applied through the main power supply line 200 to detect an interruption of the application of power-supply voltage Vcc. Upon detecting the interruption, the retract circuit 217 outputs a switch control signal SC at low level, which turns the switches 213 and 215 on. As long as the disk drive operates normally, the retract circuit 217 keeps outputting a high-level switch control signal SC, which turns the switches 213 and 215 off.

The CPU 22 repeatedly sets the voltage (control voltage) of the control capacitor 210 for each servo area, through the D/A converter 218 and buffer amplifier 219. The D/A converter 218 receives the digital control value (i.e., retract control value) from the CPU 22 and converts the same to a control voltage (analog value), by using the clock signal supplied from the CPU 22. The control voltage is applied to the buffer amplifier 219, which in turn applies the control voltage to the capacitor 210. The capacitor 210 instantaneously holds the control voltage. The buffer amplifier 219 is an operational amplifier that can process a large current. It performs feedback control to render its output voltage equal to its input voltage. The capacitor 210 is connected at one end to the control input terminal of the constant current circuit 216 and the output of the buffer amplifier 219. The other end of the capacitor 210 is connected to the ground GND.

The power-supply voltage Vcc is applied to the CPU 22 through the main power supply line 200. It is applied also to the retract circuit 217 and the D/A converter 218, both incorporated in the unloading circuit 21. Further, it is applied to the SPM driver 17, VCM driver 18, head amplifier 19, read/write circuit 20, ROM 23 and D/A converter 24, which are illustrated in FIG. 1.

Constant Current Circuit 216

Figure 4:
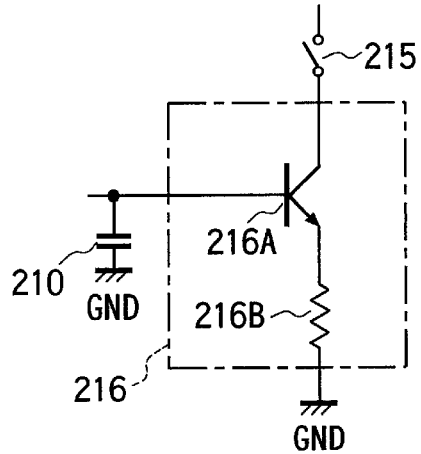
FIG. 4 is a circuit diagram of the constant current circuit incorporated in the unloading circuit shown in FIG. 3.

As shown in FIG. 4, the constant current circuit 216 comprises a transistor 216A and a resistor 216B. The transistor 216A has its collector connected to the switch 215, its base connected to one end of the control capacitor 210, and its emitter connected to one end of the resistor 216B. The other end of the resistor 216B is connected to the ground GND.

Retraction of the Head 12

Figure 2:
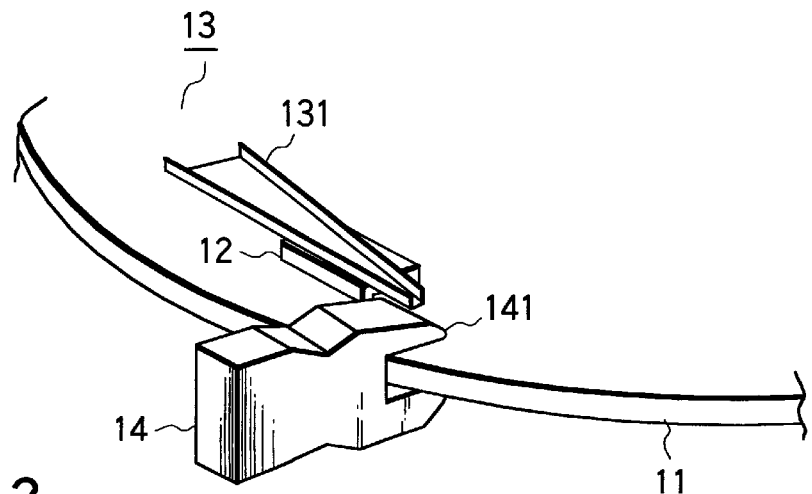
FIG. 2 is a perspective view explaining the operation of a conventional had loading/unloading disk drive.

How the head 12 is retracted (unloaded) will be explained, with reference to FIGS. 1 to 3, the flow chart of FIG. 5 and the timing chart of FIGS. 6A to 6C.

The SPM 15 keeps rotating the disk 11 at high speed as long as the disk drive receives the power from the main power supply (Vcc). The actuator 13 moves the head 12, which is floating above the spinning disk 11, whereby the head 12 performs seek operation. The head 12 reads a servo data signal from a servo area on the disk 11 and supplies the servo data signal to the head amplifier 19. The head amplifier 19 amplifies the servo data signal, generating servo data. The servo data is input to the read/write channel 20. The channel 20 extracts the servo data that includes a cylinder code (track number) and servo burst data and supplies the servo data to the CPU 22.

The CPU 22 effects a servo control in accordance with the servo data the read/write channel 20 has extracted. First, the CPU 22 determines the position the head 12 takes at present with respect to the disk 11, from the cylinder code included in the servo data. The CPU 22 then calculates a control value from the difference between the present position of the head 12 and the target position (i.e., the target track). The control value determines the best possible drive current that the VCM driver 18 should supply to the VCM 16 in order to position the head 12 at the target position.

Next, the CPU 22 outputs the control value to the D/A converter 24. The D/A converter 24 converts the control value, which is digital data, to a control voltage (analog data) having either a positive value or a negative value. The control voltage is applied to the VCM driver 18. The VCM driver 18 converts the control voltage to a drive current having a positive or negative value that is proportional to the control voltage. The drive current is supplied to the VCM 16. The VCM 16 rotates the actuator 13 with a force proportional to the drive current. As a result, the head 12, which is secured to the distal end of the suspension 131 of the actuator 13, is moved toward the target track in the radial direction of the disk 11. When the head 12 reaches the target track, the CPU 22 controls the VCM driver 28 on the basis of the servo burst data supplied from the read/write circuit 20, making the head 12 follow the target track. The head 12 reads data from or writes data from, in most cases, a plurality of data sectors included in the target track.

While effecting the servo control described above, the CPU 22 repeatedly carries out a sequence of operations as will be described below, in order to retract the head 12 timely whenever necessary.

First, the CPU 22 determines the latest one of the head positions it has calculated, from the servo data supplied from the read/write channel 20 (Step S1). The CPU 22 calculates the retraction distance the head 12 must be moved from the present position to the ramp 14 in case of interruption of the supply of power from the main power (Step S2). More specifically, the CPU 22 finds the distance between the ramp 14 and the present position of the had 12, which is the very distance the head 12 should be retracted when the application of power-supply voltage Vcc is interrupted.

Further, the CPU 22 accesses the ROM 23, referring to the control voltage table 230 and acquiring the control voltage value that corresponds to the retraction distance (Step S3). The control voltage value represents the control value (i.e., the voltage across the control capacitor 210) that will set the optimal retraction speed of the head 12. This control value can be obtained form the present position of the head 12, without calculating the retraction distance. This is because the retraction distance is the very distance between the ramp 4 and the present position of the head 12. In this case, the control voltage table 230 shows the positions each head 12 may take and the various control voltages which correspond to these positions (i.e., cylinder positions). The CPU 22 may calculate the control voltage value by using the program stored in the ROM 23, instead of using the control voltage table 230.

Next, the CPU 22 supplies the control voltage value, thus acquired in Step S3, to the D/A converter 218 incorporated in the unloading circuit 21, along with a clock signal. The D/A converter 218 converts the control voltage value to a control voltage (analog data), which is applied to the buffer amplifier 219. The buffer amplifier 219 electrically charges the control capacitor to the control voltage (Step S4). That is, the control capacitor 219 holds the optimal control voltage that corresponds to the distance the head 12 should be retracted from the present position in case of interruption of the application of power-supply voltage Vcc.

The buffer amplifier 219 controls the charging of the control capacitor 210, as will be described below with reference to FIGS. 6A to 6C.

If the voltage held in the control capacitor 210 is lower than the new control voltage, the buffer amplifier 219 discharges the control capacitor 210. The voltage in the control capacitor 210 is thereby set at the same value as the control voltage output from the D/A converter 218. On the other hand, if the voltage held in the control capacitor 210 is higher than the new control voltage, a current flows from the control the buffer amplifier 219 to the buffer amplifier 219 due to the feedback control. In this case, the voltage in the control capacitor 210 is set at the same value as the voltage input to the buffer amplifier 219, i.e., the control voltage generated by the D/A converter 218.

As shown in FIG. 3, the voltage held in the control capacitor 210 is applied to the control input terminal of the constant current circuit 216. The constant current circuit 216 can therefore supplies a drive current that accords with the voltage (i.e., control voltage) held in the capacitor 210. While power is normally supplied to the disk drive from the main power supply, however, the constant current circuit 216 does not function because the switches 213 and 215 remain off.

Figure 5:
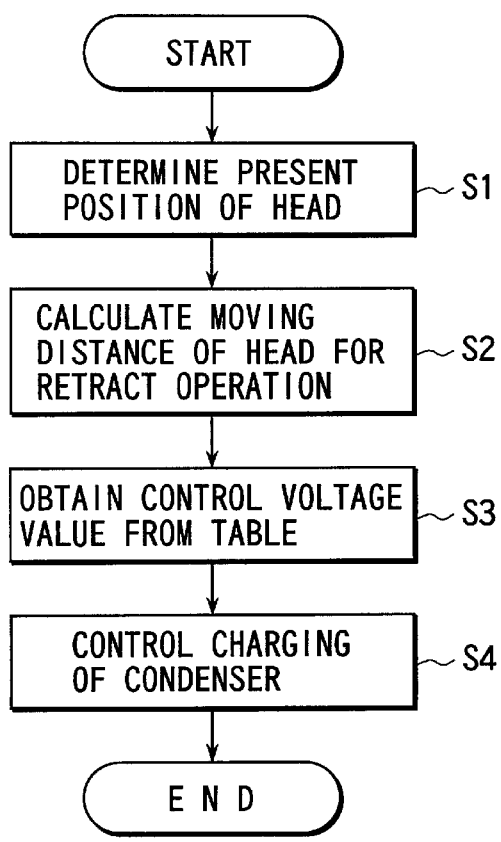
FIG. 5 is a flow chart explaining the operation of the CPU provided in the first embodiment of the invention.

As mentioned above, the CPU 22 repeatedly sets a control voltage and output the same, as shown in the flow chart of FIG. 5, while the power-supply voltage Vcc is applied to it through the main power supply line 200.

Assume that the supply of power to the disk drive from the main power supply is interrupted abruptly. Upon detecting the interruption of the supply of power, the retract circuit 217 changes the level of the switch control signal SC, form the high level to the low level. Therefore, the switch 212 is turned off, and the switches 213 and 215 are turned on. The capacitor 211, which is used as the reserve power supply, has been charged with the power-supply voltage Vcc applied from the main power supply via the main power supply line 200 and the switch 212 during the operation of the disk drive.

When the switches 213 and 215 are turned on at the interruption of the application of power-supply voltage Vcc, the voltage Vcc charged in the capacitor 211 is applied to the series circuit composed of the resistor 214, VC 16 and constant current circuit 216. The voltage Vcc charged in the capacitor 211 is not applied to any circuit other circuit (e.g., CPU 22). The switch 212 may be replaced by a diode. If this is the case, the anode and cathode of which are connected to the main power supply line 200 and the capacitor 211, respectively, and the diode operates in the same way as the capacitor 211.

As indicated above, the control input terminal of the constant current circuit 216 is receives the control voltage from the control capacitor 210. The control voltage corresponds to the position the head 12 takes when the supply of power from the power supply is interrupted (or by the retraction distance.) The constant current circuit 216 generates a drive current which is determined from the control voltage, the power-supply voltage Vcc charged in the capacitor 211, the resistance of the resistor 214 and the resistance of the coil of the VCM 16. Since the voltage Vcc, the resistance of the resistor 214 and the resistance of the coil are invariable, the drive current, which will be supplied to the VCM 16, changes with the control voltage held in the control capacitor 210 only. Hence, the control voltage corresponds to the position that the head 12 assumes when the application of power-supply voltage Vcc is interrupted.

That is, when the supply of power-supply Vcc is interrupted, the capacitor 211 is used as the reserve power supply. The VCM 15 is therefore supplied with a drive current which changes with the control voltage held in the control capacitor 210 and which corresponds to the position of the head 12 (i.e., retraction distance). Hence, the head 12 can be reliably retracted (unloaded) in accordance with its position, at the interruption of the application of power-supply voltage Vcc. More precisely, the actuator 13 can be moved toward the ramp 14 at an optimal speed since the VCM 16 is supplied with the best possible drive current that corresponds to the retraction distance, i.e., the distance between the head 12 and the ramp 14. The distal end of the suspension, which supports the head 12, therefore slides onto the onto the inclined surface 141 of the ramp 14 at the same speed, whatever the position the head 12 takes. Thus, the head 12 is reliably unloaded, and the disk 11 and the head 12 are prevented from being damaged due to impact.

In the present embodiment, the control voltage is repeatedly set on the basis of the present position of the head 12 and the control capacitor 210 holds the control voltage thus set. The head 12 can therefore be retracted the moment the interruption of the application of power-supply voltage Vcc is detected, by using the drive current determined by the voltage that is held in the control capacitor 210 when the interruption is detected. No time lag would occur even if the capacitor 211 is used as the reserve power supply for the VCM 16 at the interruption of the application of power-supply voltage Vcc.

First Modification of the Unloading Circuit

FIG. 7 is a block diagram showing the first modification of the unloading circuit 21 provided in the first embodiment of the invention. In FIG. 7, the components identical to those of the unloading circuit illustrated in FIG. 3.

The first modification is characterized in that the back EMF that is generated as the SPM 15 is driven is used, instead of the capacitor 211, as reserve power supply for the VCM 16 when the supply of power to the disk drive from the main power supply is interrupted. This unloading circuit will be described in detail, with reference to FIG. 7.

As shown in FIG. 7, the SPM 15 has three coils (U-phase coil, V-phase coil and W-phase coil). The SPM driver 17 changes over these coils (each used as the excited, or driven phase coil) and controls the currents supplied to these coils, thereby driving the SPM 15 at a prescribed speed. As the SPM 15 is so driven, a back EMF is induced in each coil. An alternating current is generated from the back EMF. The alternating currents generated in the coils are converted to direct currents by a rectifier circuit 700.

How the unloading circuit 21 shown in FIG. 7 serves to retract the head 12 will be explained below.

When the supply of power to the head loading/unloading disk drive from the main power supply is interrupted, power is no longer supplied to the SPM driver 17 through the main power supply line 200. The output of the SPM driver 17 is therefore disabled. The SPM 15 is thereby electrically disconnected from the SPM driver 17. Nonetheless, the SPM 15 keeps rotating because of its inertia, for some time after the interruption of the application of power-supply voltage Vcc. AC voltages are generated in the coils of the SPM 15 from the back EMF, for some time after the interruption of power supplying. The rectifier circuit 700 converts the AC voltages to DC voltages. The switches 213 and 215, which remained off while the disk drive was operating normally, are turned on by the switch control signal SC (at low level) supplied from the retract circuit 217 when the application of power-supply voltage Vcc is interrupted. The voltage (DC voltage) output from the rectifier circuit 700 is thereby applied to the series circuit composed of the resistor 214, VCM 16 and constant current circuit 216. At this time, the control input terminal of the constant current circuit 216 receives, from the control capacitor 210, the control voltage that corresponds to the position (or the retraction) the head 12 takes at the interruption of the application of power-supply voltage Vcc.

The constant current circuit 216 receives the control voltage from the control capacitor 210 and supplies a drive current to the VCM 16. The drive current is determined by the output voltage, the output voltage of the rectifier circuit 700, the resistance of the resistor 214 and the coil resistance of the VCM 16. Since the output voltage of the rectifier circuit 700, the resistance of the resistor 214 and the coil resistance of the VCM 16 are invariable, the drive current, which will be supplied to the VCM 16, changes with the control voltage held in the control capacitor 210 only. Hence, the control voltage corresponds to the position that the head 12 assumes when the application of power-supply voltage Vcc is interrupted. That is, when the application of power-supply voltage Vcc is interrupted, the output voltage of the rectifier circuit 700 is used as the reserve power-supply voltage, and a drive current corresponding to the position the head 12 takes at the interruption is supplied to the VCM 16. The head 12 can thereby be reliably retracted (unloaded) in accordance with its position.

Second Modification of the Unloading Circuit

Figure 8:
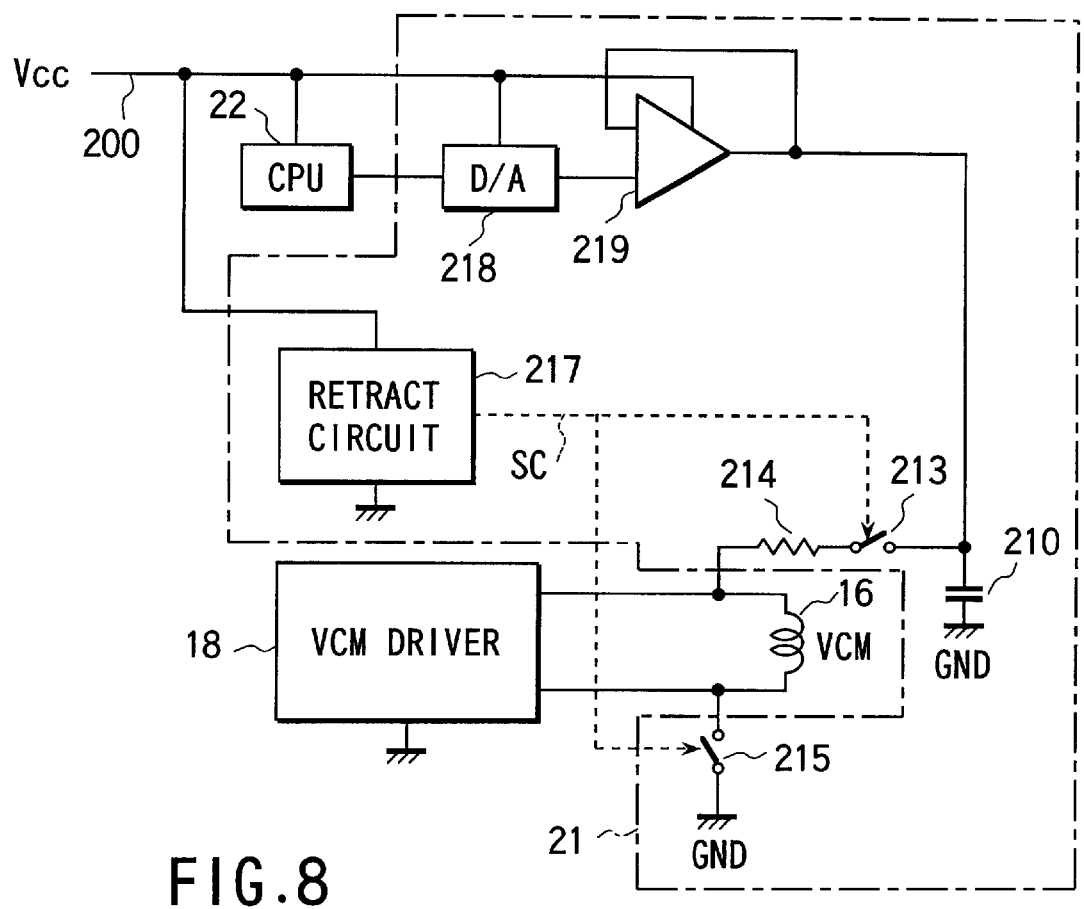
FIG. 8 is a block diagram showing the second modification of the unloading circuit provided in the first embodiment.

FIG. 8 is a block diagram showing the second modification of the unloading circuit 21 provided in the first embodiment of the invention. In FIG. 8, the components identical to those of the unloading circuit illustrated in FIG. 3.

The second modification is characterized in that the control capacitor 210 is used, instead of the capacitor 211, as reserve power supply for the VCM 16 when the supply of power to the disk drive from the main power supply is interrupted. The second modification of the unloading circuit 21 will be described in detail, with reference to FIG. 8.

Since the control capacitor 210 is used as the reserve power supply for the VCM 16 as illustrated in FIG. 8, the capacitor 211 and the constant current circuit 216 can be dispensed with. The capacitor 210 is connected at one end to the output of the buffer amplifier 219 and at the other end to the ground GND. The switches 213 and the current-limiting resistor 214 are connected in series between the first end of the control capacitor 210 and one end of the VCM 16. The switch 215 is connected to the other end of the VCM 16 and the ground GND.

How the unloading circuit 21 shown in FIG. 8 serves to retract the head 12 will be explained below.

Assume that power is supplied to the disk drive from the main power supply and that the SPM 15 is rotating at high speed, driven with the power-supply voltage Vcc. Then, the CPU 22 repeats the sequence of Steps S1 to S4 (FIG. 5), while performing servo control. Therefore, the control capacitor 210 holds a control voltage that corresponds to the retraction distance determined by the position the head 12 assumes at present.

The total charge Q accumulated in the control capacitor 210 is given as follows:

$$Q = C \cdot VO \tag{1}$$

where C is the capacitance of the capacitor 210 and VO is the control voltage.

The CPU 22 repeatedly sets a control voltage on the basis of the retraction distance and outputs the control voltage as long as the power-supply voltage Vcc is applied through the main power supply line 200. When the application of power-supply voltage Vcc is interrupted, the retract circuit 217 detects the interruption and changes the level of the switch control signal SC, form the high level to the low level. The switches 213 and 215 are thereby turned on. As a result, a drive current I(t) generated from the control voltage held in the capacitor 210 is supplied to the VCM 16. The drive current I(t) is given as follows:

$$I(t) = (VO/R)e - (1/CR)t \tag{2}$$

Where t is the time that has elapsed from the interruption of the supply of voltage Vcc (that is, from the moment the switches 213 and 215 were turned on), C is the capacitance of the capacitor 210, VO is the control voltage held in the capacitor 210, and R is the total resistance of the resistors 214 and VCM 16.

The capacitance C and the total resistance R are invariable. Hence, the drive current I(t) changes with the control voltage VO only, as can be understood from the equation (2). The drive current I(t) exponentially decreases from the value VO/R(t=0), with the time constant CR. The drive current I(t) is equivalent to the acceleration the head 12 acquires as the VCM moves it. The total charge $Q(=\int i(t)dt=C \cdot VO)$, which is the integral value of drive currents I(t), is used as a force for retracting the head 12. The head-retracting force can be controlled by adjusting the control voltage held in the control capacitor 210 in accordance with the retraction distance determined by the position of the head 12.

Third Modification of the Unloading Circuit

Figure 9:
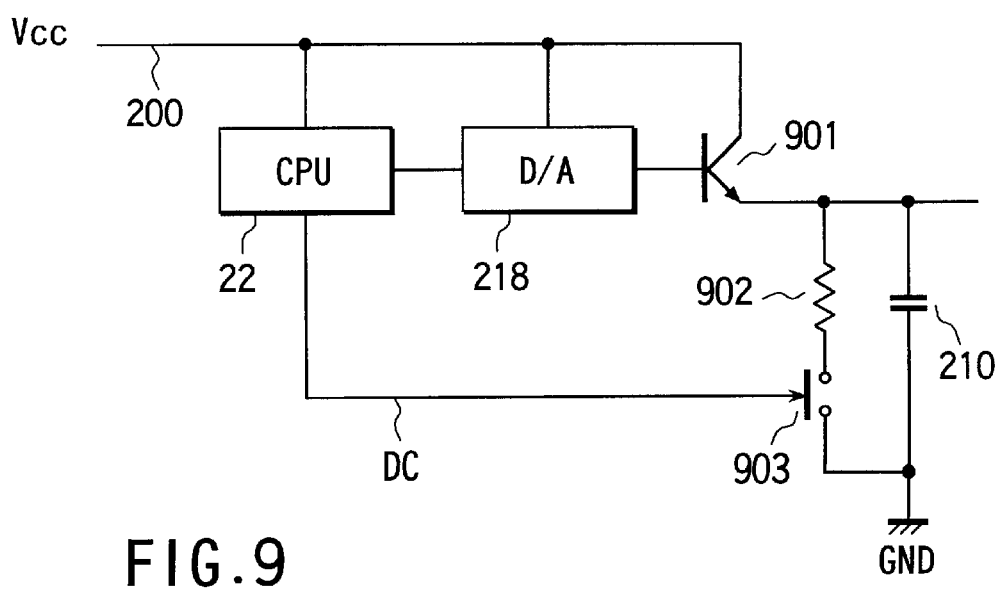
FIG. 9 is a block diagram showing the third modification of the unloading circuit provided in the first embodiment.

FIG. 9 is a block diagram showing the third modification of the unloading circuit 21 provided in the first embodiment of the invention. The third modification is characterized in that the control voltage held in the capacitor 210 is adjusted without using the buffer amplifier 219.

As shown in FIG. 9, a transistor 901 is provided. The transistor 901 is driven by the output voltage (control voltage) of the D/A converter 218. The transistor 901 has its collector connected to the main power supply line 200, its base connected to the output of the D/A converter 218, and its emitter connected to one end of the capacitor 210. A resistor 902 and a switch 903 are connected in series between this end of the capacitor 210 and the ground GND.

Unlike the switches 213 and 215, the switch 903 is a semiconductor element such as a FET, which is turned off when the application of power-supply voltage Vcc is interrupted. The switch 903 is controlled by a discharge signal DC supplied from the CPU 22. It remains on as long as the discharge signal DC stays at high level.

Figure 10:
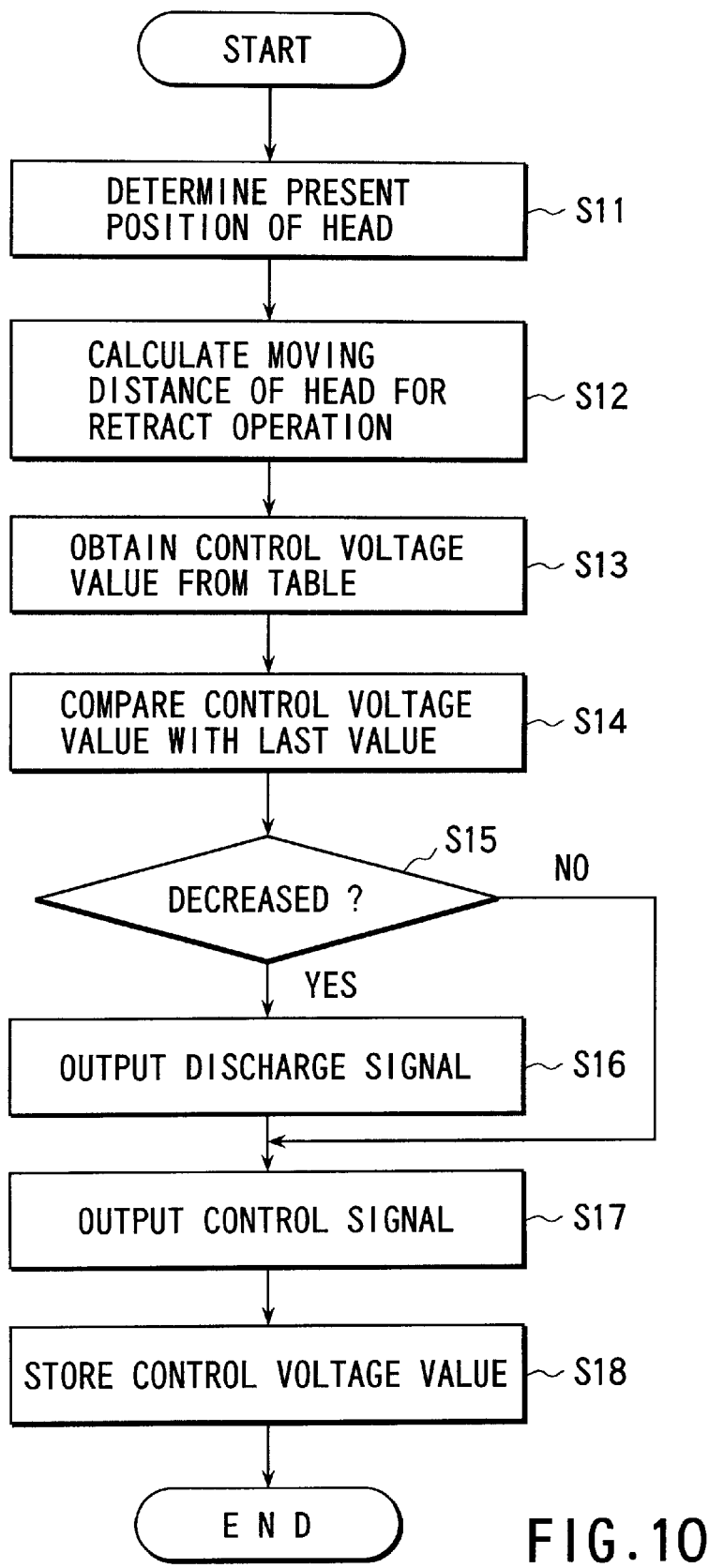
FIG. 10 is a flow chart explaining how the CPU operates in the case where the third modification of the unloading circuit is used.

The CPU 22 repeatedly sets a control voltage and outputs the control voltage, as will be described below with reference to the flow chart of FIG. 10.

First, the CPU 22 determines the position the head 12 assumes at present with respect to the disk 11. The CPU 22 then calculates a retraction distance by which the head 12 should be retracted from the present position to the ramp 14 if the application of power-supply voltage Vcc were interrupted (Steps S11 and S12). The CPU 22 refers to the control voltage table 230 stored in the ROM 23, acquiring the retract control voltage optimal for retracting the head 12 for the retraction distance calculated (Step S13).

Next, the CPU 22 compares the control voltage with the control voltage previously used, determining whether the control voltage should be decreased below the previously used one (Steps S14 and S15). If YES in Step S15, the CPU 22 outputs the discharge signal DC at high level for a predetermined time (Step S16). At the same time, the CPU 22 supplies to the D/A converter 218 the control voltage value acquired in Step S13, along with a clock signal (Step S17).

While the discharge signal DC output from the CPU 22 stays at high level, the switch 903 remains on, and the capacitor 210 is discharged to the ground GND through the resistor 902. The voltage held in the capacitor 210 therefore decreases with a time constant CRdc, where C is the capacitance of the capacitor 210 and Rdc is the resistance of the resistor 902. The time required to discharge the capacitor 210, i.e., the time during which the discharge signal DC stays at high level, should be much shorter than the time that elapses until the servo data is read from the next servo area (e.g., about a tenth of this time) and should be longer than the time constant CRdc (e.g., about half the time constant CRdc).

The D/A converter 218 receives the digital control value supplied from the CPU 22 and converts the same to a control voltage (analog value), by using the clock signal supplied from the CPU 22. The control voltage is applied to the base of the transistor 901. In the present modification of the unloading circuit 21, the base voltage of the transistor 901, i.e., the control voltage output from the A/D converter 218, may be lower than the emitter voltage of the transistor 901, i.e., the voltage held in the capacitor 210. That is, no base-emitter voltage high enough to drive the transistor 901 may be obtained. In this case, the capacitor 210 is therefore discharged to the ground GND via the series circuit of the resistor 902 and switch 903.

When the capacitor 210 is discharged, the voltage held in the capacitor 210, i.e., the emitter voltage of the transistor 901, falls below the base voltage of the transistor 901. An emitter-base voltage high enough to drive the transistor 901 is therefore obtained. Driven by this emitter-base voltage, the transistor 901 supplies a current, which corresponds to the emitter-base voltage, to the capacitor 210. The capacitor 210 therefore accumulates the charge and holds a voltage equal to the base voltage of the transistor 901, i.e., the control voltage output from the D/A converter 218 (i.e., the control voltage set by the CPU 22).

If the CPU 22 determines in Step S15 that the control voltage should not be decreased below the previously used one, the operation goes to Step S17, skipping Step S16. In Step S17, the CPU 22 outputs the control voltage value (digital control value) obtained in Step 13, to the D/A converter 218. The D/A converter 218 converts the digital control value to a control voltage (analog value), by using the clock signal supplied from the CPU 22, an d applies the control voltage to the base of the transistor 901. The base voltage of the transistor 901 (i.e., the output voltage of the D/A converter 218) may be higher than the emitter voltage of the transistor 901 (i.e., the voltage held in the capacitor 210). Thus a base-emitter voltage high enough to drive the transistor 901 can not be obtained. If this is the case, the transistor 901 immediately supplies a current corresponding to the base-emitter voltage, to the capacitor 210. The capacitor 210 accumulates a charge and holds a voltage equal to the base voltage of the transistor 210 , i.e., the control voltage (the control voltage set by the CPU 22) output from the D/A converter 218.

After performing Step S17, the CPU 22 stores the control voltage value it has acquired, in place of the previously stored one (Step S18). The control voltage value previously stored is, for example, zero (0). The CPU 22 thus sets the voltage (control voltage) of the control capacitor 210 for the servo area.

The first to third modifications of the unloading circuit 21 are designed for use in head loading/unloading disk drives. Nonetheless, the present invention can be applied to CSS disk drives, too.

Second Embodiment

Figure 11:
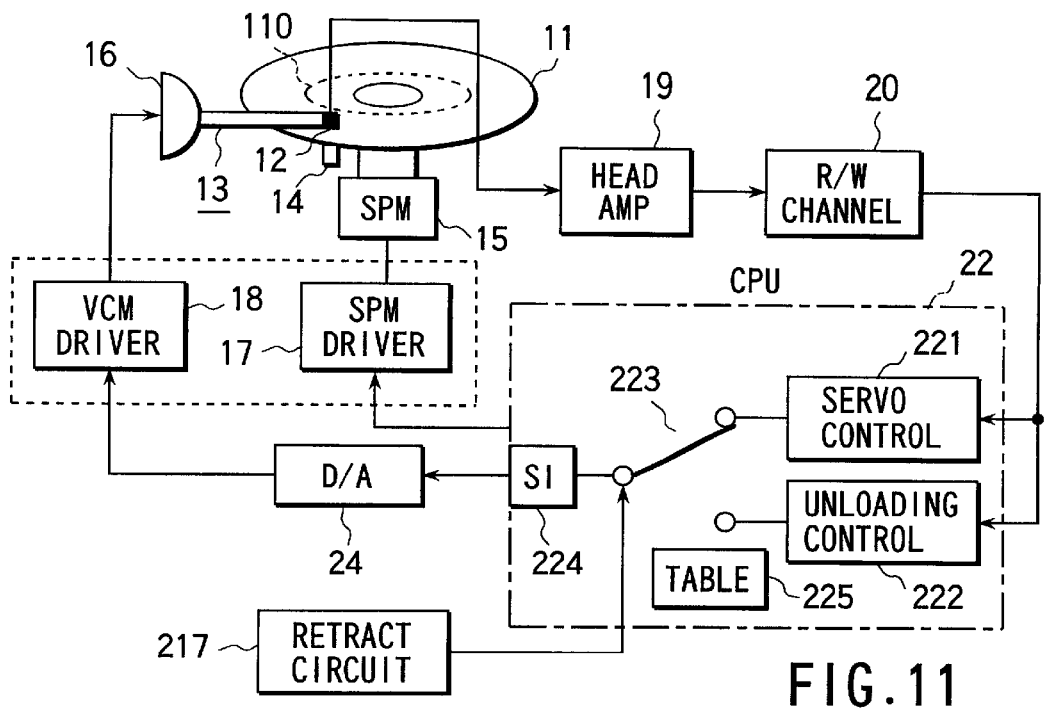
FIG. 11 is a block diagram showing the major components of a disk drive incorporating the second embodiment of the present invention.

FIG. 11 is a block diagram showing the major components of a disk drive incorporating the second embodiment of the present invention. In FIG. 11, the components identical to those shown in FIG. 1 are designated at the same reference numerals.

As shown in FIG. 11, the disk incorporated in this disk drive has an unloading area 110. The head 12 will be held at the unloading area 110 if the host system gives no command to access a prescribed track in the data zone of the disk 11, e.g., the track at the middle zone between the outermost track and the innermost track, for a period equal to or longer than a predetermined value.

In the disk drive shown in FIG. 11, the retract circuit 217 monitors the power-supply voltage Vcc applied from the main power supply. Upon detecting an interruption of the application of power-supply voltage Vcc, the retract circuit 217 outputs a detection signal to the CPU 22. The CPU 22 has a servo control section 221, an unloading control section 222, a switch circuit 223, a serial interface (SI) 224, and a control voltage control pattern table 225. The servo control section 221 performs servo control in the known manner to move the head 12 to a desired position. The unloading control section 222 operates when the application of power-supply voltage Vcc is interrupted; it serves to retract the head 12 to the ramp 14. The unloading control section 222 calculates a retraction distance, i.e., the distance between the present position of the head 12 and the retraction position (i.e., the ramp 14) and a control value from the retraction distance. The switch circuit 223 operates in accordance with a detection signal supplied from the retract circuit 217. The switch circuit 223 connects the SI 224 to the servo control section 221 during the normal operation of the disk drive, supplying the output of the servo control section 221 to the SI 224. The control voltage pattern table 225 is stored in the ROM (not shown) provided in the CPU 22.

As described above, the D/A converter 24 converts the digital control value supplied from the CPU 22 via the SI, to a control voltage (i.e., analog control value). The control voltage is applied to the VCM driver 18. The VCM driver 18 converts the control voltage to a drive current, which is supplied to the VCM 16. Thus, the disk drive performs normal operation as long as the power-supply voltage Vcc is applied from the main power supply. When the application of power-supply voltage Vcc is interrupted, the reserve power supply, which will be described later, supplies power to the circuit system including the VCM driver 18, CPU 22 and D/A converter 24. Hereinafter the circuit system will be referred to as "unloading control circuit system."

Unloading Control

Figure 12:
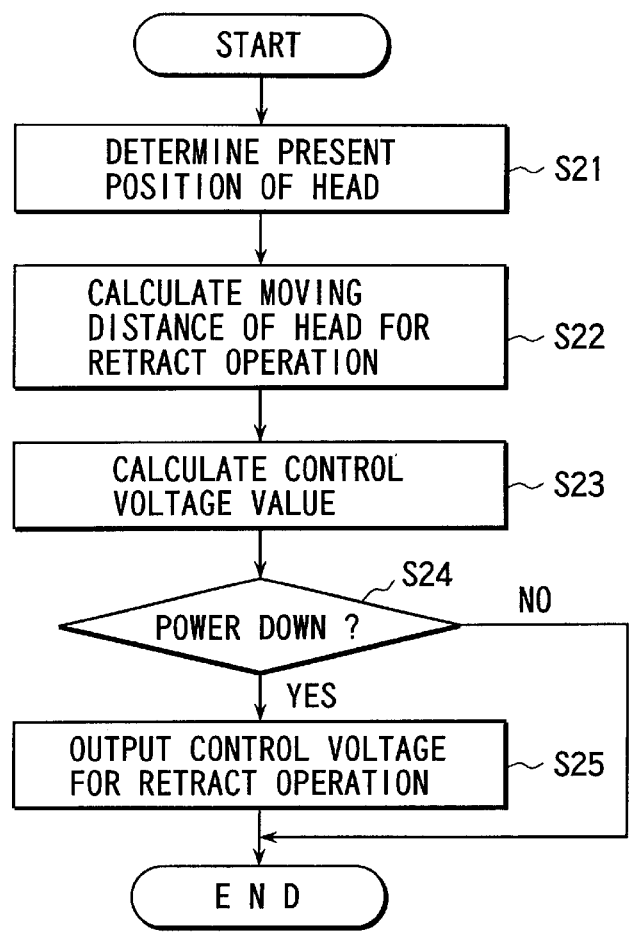
FIG. 12 is a flow chart explaining the operation of the CPU provided in the second embodiment of the invention.

The unloading control achieved in the second embodiment will be described, with reference to FIG. 11 and the flow chart of FIG. 12.

The disk drive normally operates in the same way as the first embodiment as long as the power-supply voltage Vcc is applied to it from the main power supply. More specifically, the CPU 22 effects servo control in accordance with the servo data the head 12 has read from the disk 11, to move the head 12 to the target position (target track) on the disk 11. That is, the CPU 22 calculates a digital control value from the distance between the present position of the head 12 (i.e., the track at which the head 12 is now positioned) and the target position. The digital control value is either a positive one or a negative one, indicating the direction in which the head 12 should be moved.

The digital control value is supplied from the CPU 22 to the D/A converter 24 through the SI 224. The D/A converter 24 converts the digital control value to a control voltage (analog control value) that is either positive or negative. The control voltage is applied to the VCM driver 18. The VCM diver 18 converts the control voltage to a drive current, which is supplied to the VCM 16. The VCM 16 drives the actuator 13 is rotated, moving the head 12 in the radial direction of the disk 11 until the head 12 reaches the target position. At the target position the head 12 reads data from, or writes data on, the target track provided on the disk 11.

Namely, the CPU 22 performs the sequence of Steps S21 to S24 during the normal operation of the disk drive, so as to effect unloading control if the application of power-supply voltage Vcc is interrupted. More precisely, the CPU 22 determines the present position of the head 12 (i.e., the track at which the head is positioned at present), which has been calculated by the servo control 221 (Step S21). The data representing the present position of the head 12 is stored in a memory (not shown). The CPU 22 calculates the retraction distance for which the head 12 should be moved to reach the retraction position (i.e., the ramp 14) (Step S22). That is, the CPU 22 finds the difference between the position of the ramp 14 and the present position of the head 12. Then, the CPU 22 calculates the control value (a positive control voltage or a negative control voltage) and the control time, which are required to move the head 12 for the retraction distance calculated (Step S23). Since the retraction distance can be directly determined from the present position of the head 12, the CPU 22 need not carry out calculation to obtain the retraction distance.

Next, the CPU 22 determines whether or not the retract circuit 21 has detected an interruption of the application of power-supply voltage Vcc (Step S24). If NO in Step S24, the CPU 22 terminates the unloading control. The CPU 22 repeats Step S1 et seq. as long as the retract circuit 21 detects.no interruption of the application of power-supply voltage Vcc.

If YES in Step S24, that is, if the retract circuit 21 has detected an interruption of the application of power-supply voltage Vcc, the operation goes to Step 25. In Step 25, the retract circuit 21 supplies a detection signal to the switch circuit 223, which connects the SI 224 to the unloading control section 222. As a result, a voltage is applied for a prescribed time from the reserve power supply to the unloading control circuit system including the VCM driver 18, CPU 22 and D/A converter 24, when the application of power-supply voltage Vcc is interrupted.

To retract the head 12 from the present position to the ramp 14 while the power is supplied to the unloading control circuit system from the reserve power supply, the CPU 22 supplies the control value obtained in Step S23 to the D/A converter 24 via the SI 224. The D/A converter 24 applies a control voltage (analog control value) to the VCM driver 18 while receiving the digital control value from the CPU 22. The VCM driver 18 converts the control voltage to a drive current, which is supplied to the VCM 16 (Step S25). The VCM 16 rotates the actuator 13 until the suspension 131 reaches the ramp 14. The distal end of the suspension 131 slides onto the inclined surface 141 of the ramp 14, and the suspension 131 is stopped. Thus, the head 12 is retracted to the ramp 14 and held at the retraction position (see FIG. 2).

In the second embodiment, the reserve power supply applies a power-supply voltage for a predetermined time to the unloading control circuit system including the CPU 22 to retract the head 12, when the application of power-supply voltage Vcc is interrupted abruptly. In the CPU 22, the switch circuit 223 disconnects the SI 224 from the servo control section 221 and connects the SI 224 to the unloading control section 222. The CPU 22 calculates the control value and the control time, both required to move the head 12 for the retraction distance the CPU 22 has calculated. The VCM driver 18 is controlled in accordance with the control value and the control time. The VCM 16 therefore receives an appropriate drive current and retracts the head 12 at an optimal speed. The distal end of the suspension 131, which supports the head 12, therefore slides onto the onto the inclined surface 141 of the ramp 14 at the same speed, whatever the position the head 12 takes. Thus, the head 12 are prevented from being damaged due to impact.

As in the first embodiment, the CPU 22 repeats the sequence of particular steps to calculate calculates the control value and the control time from the position of the head 12. Hence, the unloading control can be accomplished at once when the interruption of the application of power-supply voltage Vcc is detected, on the basis of the control value and control time that the CPU 22 has calculated immediately before the detection of the interruption. The CPU 22 may perform Steps S21 to S25 after the detection of the interruption if the reserve power supply can supply sufficient power.

First Modification of the Unloading Control

Figure 13:
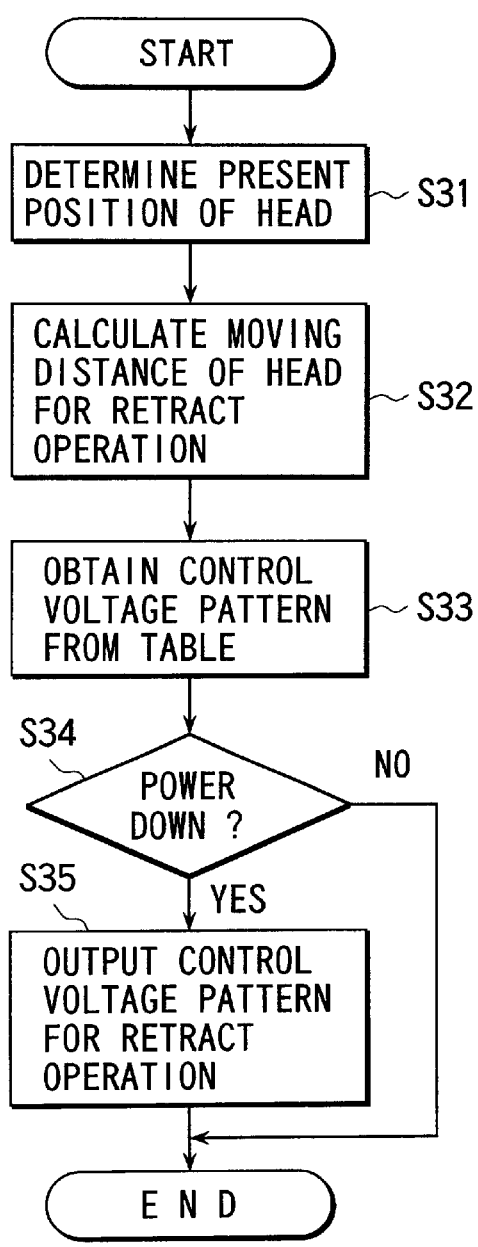
FIG. 13 is a flow chart explaining the first modification of the unloading control performed in the second embodiment.

FIG. 13 is a flow chart explaining the operation of the first modification of the unloading control that may be performed in the second embodiment. In this modified unloading control, one of the control voltage patterns stored in the control voltage pattern table 225 is selected in accordance with the retraction distance. The control voltage pattern thus selected is used to retract the head 12, not the control value calculated from the retraction distance as in the unloading control described above. The first modification of the unloading control will be explained in detail, with reference to the flow chart of FIG. 13.

First, the servo control section 221 and the unloading control section 222 cooperates, calculating the retraction distance, i.e., the distance between the present position of the head 12 and the ramp 14 (Steps S31 and S32). The CPU 22 selects refers to the control voltage pattern table 225 and acquires the control voltage pattern (a time-based pattern) that is the most desirable to retract the head 12 for the retraction distance (Step S33). The control voltage pattern table 225 represents various. voltage-time pairs, each consisting of a control value (control voltage) and a control time. Namely, the CPU 22 acquires the most desirable control voltage pattern, without performing any calculation.

The CPU 22 determines whether or not the retract circuit 21 has detected an interruption of the application of power-supply voltage Vcc (Step S34). If NO in Step S34, the CPU 22 terminates the unloading operation. The CPU 22 repeats Step S1 et seq. as long as the retract circuit 21 detects no interruption of the application of power-supply voltage Vcc.

If YES in Step S34, that is, if the retract circuit 21 has detected an interruption of the application of power-supply voltage Vcc, the operation goes to Step 35. In Step 35, the retract circuit 21 supplies a detection signal to the switch circuit 223, which connects the SI 224 to the unloading control section 222. As a result, the control value that changes with time in accordance with the control voltage pattern acquired from the table 225 is applied to from the SI 224 to the D/A converter 24. The control voltage corresponding to the control value is applied for a prescribed time from the D/A converter 24 to the VCM driver 18 (Step S35). The VCM driver 18 supplies a drive current that changes with time in accordance with the control voltage pattern, to the VCM 15. Thus, the reserve power supply serves to achieve a precise unloading control when the application of power-supply voltage Vcc is interrupted.

Second Modification of the Unloading Control

Figure 14:
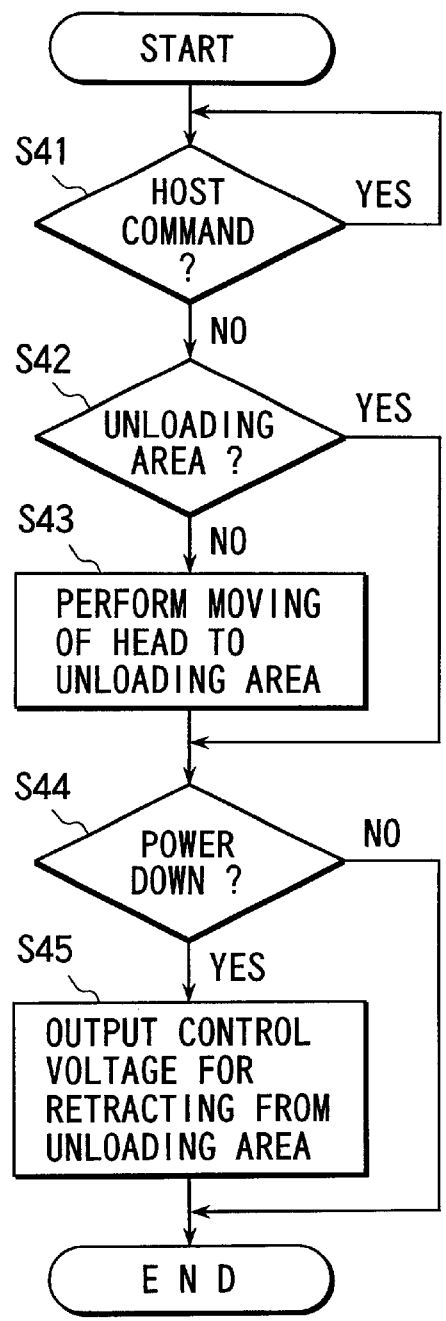
FIG. 14 is a flow chart explaining the operation of the second modification of the unloading control effected in the second embodiment.

FIG. 14 is a flow chart explaining the operation of the second modification of the unloading control that may be performed in the second embodiment. In the second modified unloading control, the head 12 is moved to and held at the unload area (FIG. 11) of the disk 11 if the host system gives no command to the disk drive for a period equal to or longer than a predetermined value. The first modification of the unloading control will be explained in detail, with reference to the flow chart of FIG. 14.

First, the CPU 22 determines whether or not the disk drive has received a command from the host system within a predetermined period, by using a timer (Step S41). If NO in Step S41, the CPU 22 determines whether or not the head 12 is positioned at the unload area 110 of the disk 11 (Step S42).

If NO in Step S42, that is, if the head 12 is outside the unload area 110, the CPU 110 causes the SI 224 and D/A converter 24 to control the VCM driver 18. The head 12 is thereby moved to the unload area 110 in the same way as in seek operation (Step S43). If YES in Step S42, that is, if the head 12 is positioned at the unload area 110, the operation jumps to Step S44, skipping Step S43.

In Step S44, the CPU 22 determines whether or not the retract circuit 21 has detected an interruption of the application of power-supply voltage Vcc. If NO in Step S44, that is, if the circuit 21 has detected no interruption, the CPU 22 terminates the unloading control and repeats the sequence of Steps S41 to S44.

If YES in Step S44, that is, if the circuit 21 has detected an interruption, the switch circuit 223 disconnects the SI 224 from the servo control section 221 and connects the SI 224 to the unloading control section 222, so that the output of the unloading control section 222 may be supplied to the D/A converter. The CPU 22 supplies a control voltage value for retracting the head 12 to the ramp 14, to the D/A converter 24 through the SI 224, and the D/A converter 24 applies a control voltage to the VCM driver 18 (Step S45). The control voltage value corresponds to the control value and control time specific to the unload area 110. The VCM 16 drives the actuator 13, which retracts the head 12 to the ramp 14 at the best possible speed. In this unloading control, the control voltage pattern corresponding to the distance between the unloading area 110 and the ramp 14 may be used as in the second modification of the unloading control.

The unloading control performed in the second embodiment and the first and second modifications the unloading control are open-loop controls. If the reserve power supply can supply sufficient power, the VCM 16 may be feedback-controlled at regular intervals on the basis of the back electromotive force, which depends on the speed at which the VCM 16 rotates the actuator 13. In this case, the CPU 22 incorporates a timer for measuring the intervals are measured and an A/D converter for converting the back electromotive force to a digital value. The digital value thus obtained is stored in a memory.

The second embodiment and the two modifications of the unloading control, all described above, are designed for use in head loading/unloading disk drives. Nevertheless, the present invention can be applied to CSS disk drives, too.

Reserve Power Supply

Four types of reserve power supplies, all for use in the second embodiment and the two modifications of unloading control, will be described with reference to FIGS. 15 to 18, respectively. The components identical to those shown in FIG. 11 are denoted at the same reference numerals in FIGS. 15 to 18.

Reserve Power Supply of the First Type

Figure 15:
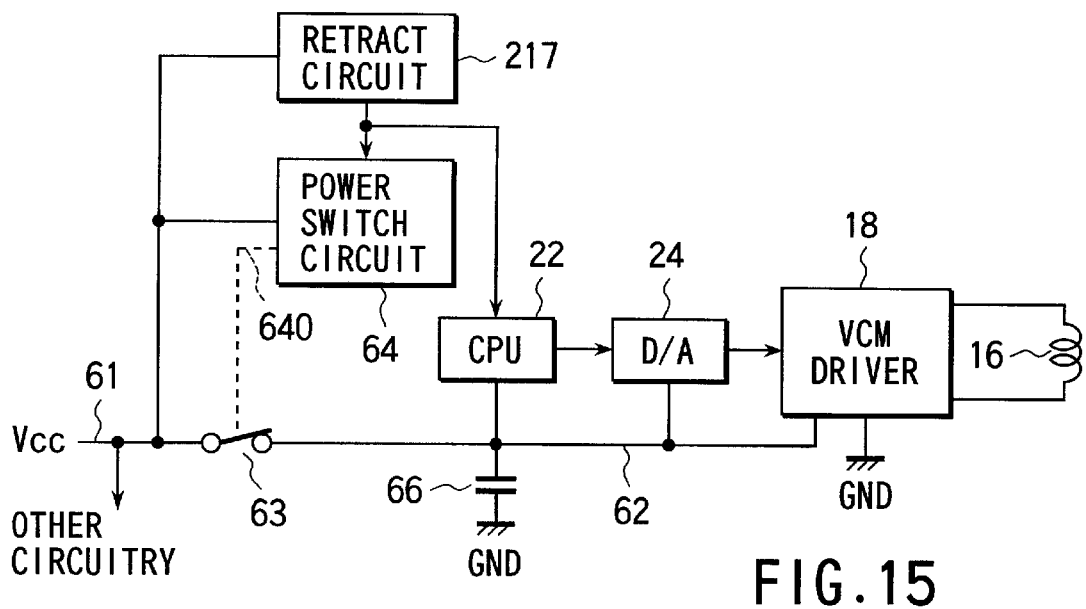
FIG. 15 is a block diagram depicting the first type of a reserve power supply for use in the second embodiment of the invention.

As shown in FIG. 15, a capacitor 66 is provided for supplying power to achieve unloading control when the application of power-supply voltage Vcc is interrupted. A switch 63 is connected between a power supply line 61 (first power supply line) and a reserve power supply line 62 (second power supply line). The line 61 is provided to supply the power from the main power supply, and the line 62 to supply the power from the capacitor 66. The switch 63 is a semiconductor switch such as a FET. The switch 63 remains on (closed) while the disk drive is normally operating with the power-supply voltage Vcc. When the application of power-supply voltage Vcc is interrupted, the switch 63 is turned off (opened).

The second power supply line 62 is used to apply the power-supply voltage Vcc from the first power-supply line 61 to the CPU 22, D/A converter 24 and VCM driver 18, all included in the unloading control circuit system, as long as the switch 63 remains on. Connected to the first power supply line 61 are the SPM driver 17, head amplifier 19, read/write channel 20 and the like (see FIG. 1), which are not the components of the unloading control circuit system. Also connected to the first power supply line 61 are a retract circuit 271 and a power switch circuit 64. The circuit 271 is designed to detect an interruption of the application of power-supply voltage Vcc. The circuit 64 is provided to switch from the main power supply to the reserve power supply when the retract circuit 271 detects an interruption of the application of power-supply voltage Vcc.

The power switch circuit 64 sets a switch control signal 640 at high level as long as the power-supply voltage Vcc is applied to the disk drive and the disk drive therefore normally operates. It sets the signal 640 at low level when the application of power-supply voltage Vcc is interrupted. The signal 640 is used to turn on and off the switch 63. More specifically, the switch 63 is closed (on) while the switch control signal 640 remains at high level.

The capacitor 66 is connected between the second power supply line 62 and the ground GND. The capacitor 66 is therefore charged with the power-supply voltage Vcc. The capacitor 66 functions as reserve power supply for supplying power to the unloading control circuit system only.

How the power supply is switched from the main power supply to the reserve power supply will be described below.

While the disk drive is being supplied with power from the main power supply and thus operating normally, the power-supply voltage Vcc is applied through the first power supply line 61 to the circuits incorporated in the disk drive. When the application of power-supply voltage Vcc is interrupted, the interruption is detected by the retract circuit 217. The retract circuit 217 generates a signal that shows that the application of power-supply voltage Vcc has been interrupted. This signal is supplied to the CPU 22 and the power switch circuit 64. In response the signal, the power switch circuit 64 changes the level of the switch control signal 640, from the high level to the low level. The switch 63, which has been on (closed), is thereby turned off (opened), disconnecting the second power supply line 62 from the first power supply line 61.

The capacitor 66 connected between the second power supply line 62 and the ground GND has already been charged with the voltage Vcc applied from the main power supply during the normal operation of the disk drive. The voltage Vcc held in the capacitor 66 is applied to the unloading control system including the CPU 22 connected to the second power supply line 62. (The unloading control system including the CPU 22 further includes the D/A converter 24 and the VCM driver 18.) Since the switch 63 has disconnected the second power supply line 62 from the first power supply line 61, the power-supply voltage Vcc is not applied to any circuit that is provided outside the unloading control system.

At the interruption of the application of power-supply voltage Vcc, the power-supply voltage Vcc is applied from the capacitor 66, i.e., the reserve power supply, to only the unloading control system (including the CPU 22) that operates to accomplish unloading control. Hence, the capacitor 66 can supply power required for the unloading control, thought it has a relatively small capacitance.

Figure 19:
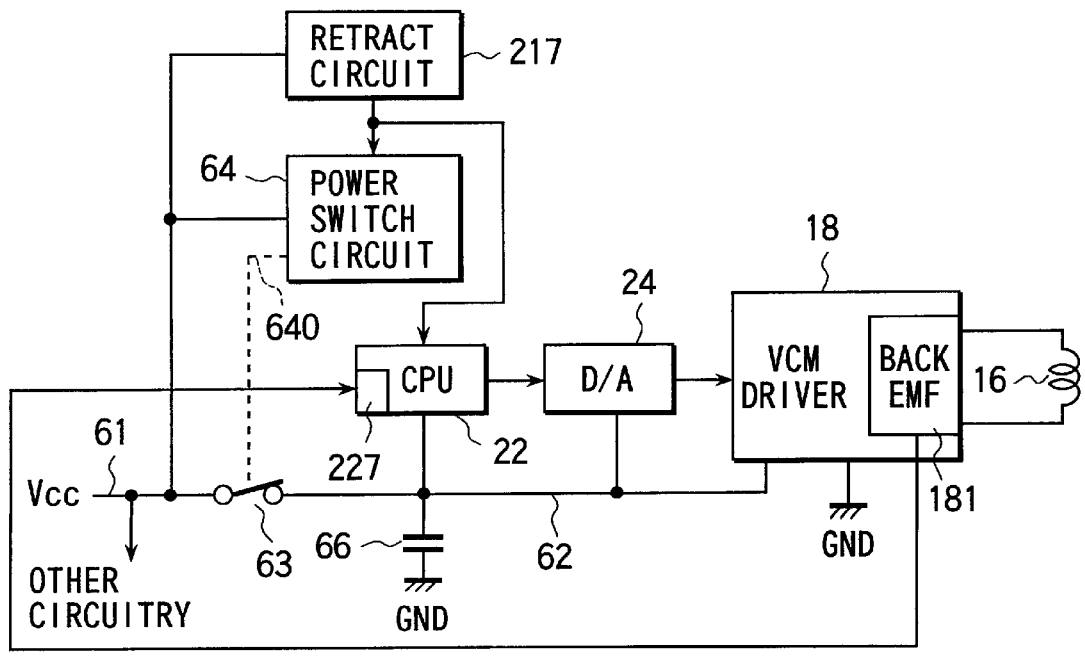
FIG. 19 is a block diagram depicting a modification of the first-type reserve power supply.

FIG. 19 shows a modification of the first-type reserve power supply shown in FIG. 15. The modified reserve power supply is characterized in that the VCM driver 18 incorporates a back EMF detecting circuit 181. The back EMF detecting circuit 181 detects the voltage of the back electromotive force generated as the VCM 16 is driven. The back electromotive force is proportional to the drive speed of the VCM 16. Therefore, the CPU 22 can perform feedback control on the basis of the output of the back EMF detecting circuit 181, thereby accomplishing the unloading control of the head 12.

More precisely, the CPU 22 receives the output of the back EMF detecting circuit 181 through an A/D converter 277. The CPU 22 repeatedly performs feedback control on the VCM 16 via the VCM driver 18 at regular intervals, so that the head 12 may be moved at a constant speed.

Reserve Power Supply of the Second Type

Figure 16:
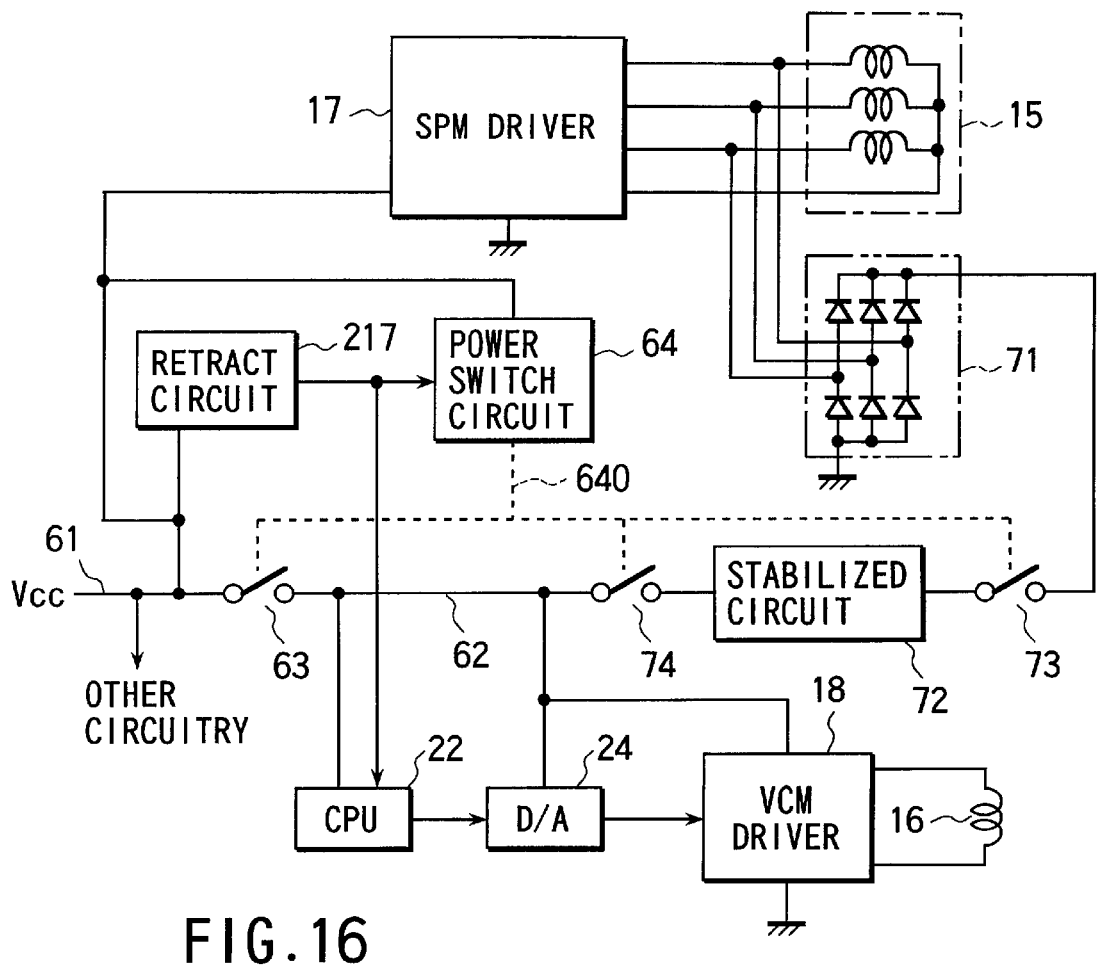
FIG. 16 is a block diagram showing the second type of a reserve power supply for use in the second embodiment.

FIG. 16 shows the second type of a reserve power supply for use in the second embodiment. The components identical to those shown in FIG. 15 are designated at the same reference numerals.

As shown in FIG. 16, the SPM 15 has three (U-phase coil, V-phase coil and W-phase coil). The SPM driver 17 changes over these coils (each used as the excited, or driven phase coil) and controls the currents supplied to these coils, thereby driving the SPM 15 at a prescribed speed. As the SPM 15 is so driven, a back EMF is induced in each coil. The reserve power supply of the second type is designed to output power and comprises a rectifier circuit 71 and a power-stabilizing circuit 72. The rectifier circuit 71 rectifies the alternating currents generated the back EMFs induced in the U-phase coil, V-phase coil and W-phase coil. The power-stabilizing circuit 72 stabilizes the outputs of the rectifier circuit 71. The circuit 72 is a DC-DC converter.

A switch 73 is connected between the output of the rectifier circuit 71 and the input of the power-stabilizing circuit 72. Further, a switch 74 is connected between the output of the power-stabilizing circuit 72 and the second power supply line 62. The switches 73 and 74 are, for example, semiconductor elements such as FETs. Both switches 73 and 74 remain off (opened) while the switch control signal 640 supplied from the power switch circuit 64 stays at high level, or while the disk drive is operating normally. They are turned on (closed) when the application of power-supply voltage Vcc is interrupted, or when the switch control signal 640 falls to low level. Namely, the operating mode of the switches 73 and 74 is opposite to that of the switch 63 connected between the first power supply line 61 and the second power supply line 62.

How the power supply is switched from the main power supply to the reserve power supply will be described below.

While the disk drive is being supplied with power from the main power supply and thus operating normally, the power-supply voltage Vcc is applied through the first power supply line 61 to the circuits incorporated in the disk drive.

When the application of power-supply voltage Vcc is interrupted, the interruption is detected by the retract circuit 217. The retract circuit 217 generates a signal that shows that the application of power-supply voltage Vcc has been interrupted. This signal is supplied to the CPU 22 and the power switch circuit 64. In response the signal, the power switch circuit 64 changes the level of the switch control signal 640, from the high level to the low level. The switch 63, which has been on (closed), is thereby turned off (opened), disconnecting the second power supply line 62 from the first power supply line 61. At the same time, the switches 73 and 74, which have been off (opened), are turned on (closed).

At the interruption of the application of power-supply voltage Vcc, power is no longer supplied to the SPM driver 17 through the first power supply line 61. The output of the SPM driver 17 is therefore disabled. The SPM 15 is thereby electrically disconnected from the SPM driver 17. Nonetheless, the SPM 15 keeps rotating because of its inertia, for some time after the interruption of the application of power-supply voltage Vcc. AC voltages are generated in the coils of the SPM 15 from the back EMF, for some time after the interruption of power supplying.

The rectifier circuit 71 converts the AC voltages to DC voltages. The switches 73 and 74, which remained off while the disk drive was operating normally, are turned on by the switch control signal 640 (at low level) supplied from the power supply switch circuit 64 when the application of power-supply voltage Vcc is interrupted. The power-stabilizing circuit 72 stabilizes the voltage (DC voltage) output from the rectifier circuit 71. The voltage stabilized is applied to only the unloading control system (including the CPU 22, D/A converter 24 and VCM driver 18) through the second power supply line 62. As a result, the unloading control system including the CPU 22 reliably operates even if the application of power-supply voltage Vcc is interrupted, and the unloading control is effected in the best possible manner in accordance with the position of the head 12.

Figure 20:
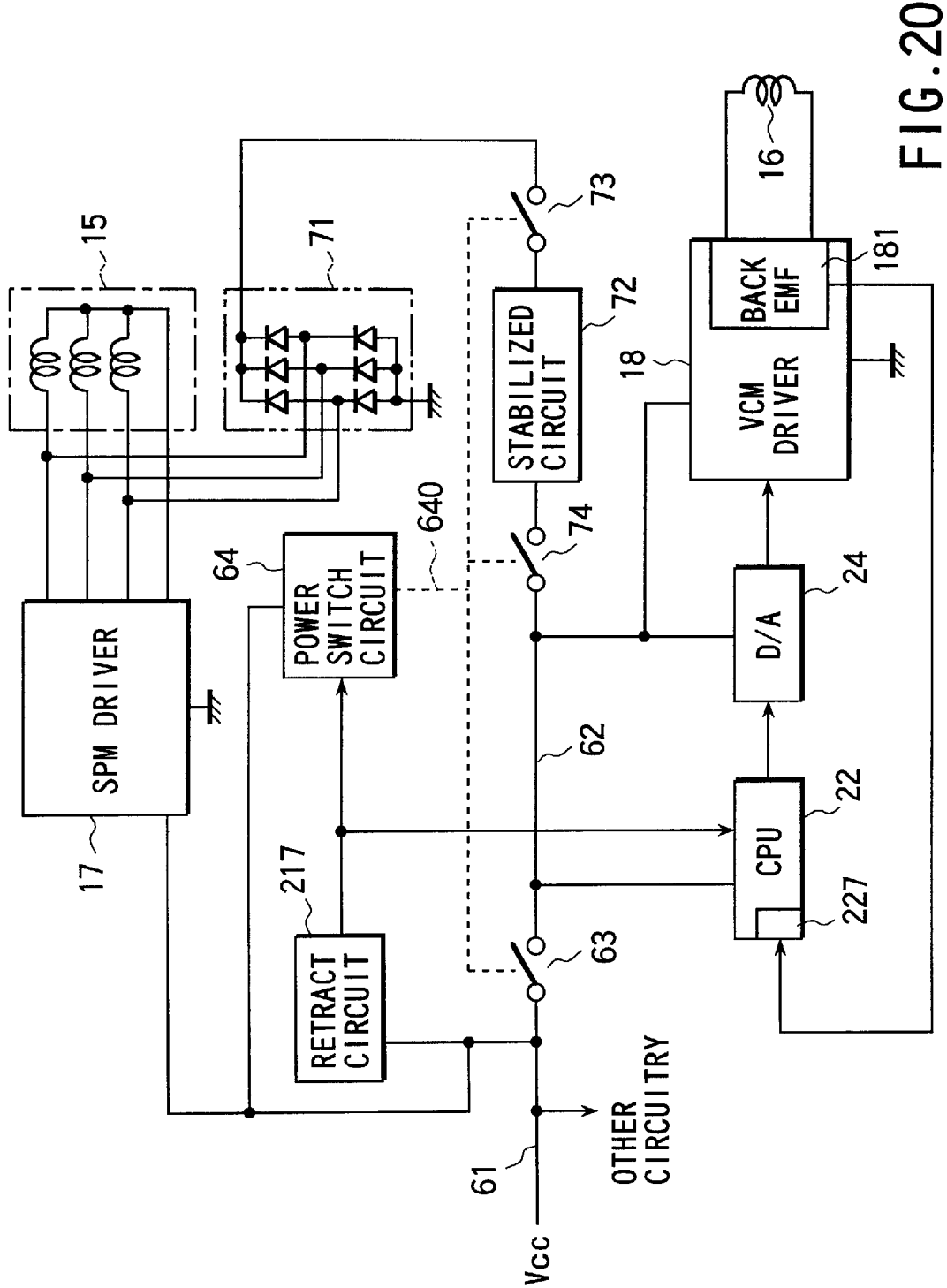
FIG. 20 is a block diagram showing a modification of the reserve power supply of the second type.

FIG. 20 illustrates a modification of the second-type reserve power supply shown in FIG. 16. The modified reserve power supply is characterized in that the VCM driver 18 incorporates a back EMF detecting circuit 181, as in the modification of the first-type reserve power supply of FIG. 15. Therefore, the CPU 22 can perform feedback control on the basis of the output of the back EMF detecting circuit 181, thereby accomplishing the unloading control of the head 12. To be more specific, the CPU 22 receives the output of the back EMF detecting circuit 181 through an A/D converter 277. The CPU 22 then repeatedly performs feedback control on the VCM 16 via the VCM driver 18 at regular intervals, so that the head 12 may be moved at a constant speed.

Reserve Power Supply of the Third Type

Figure 17:
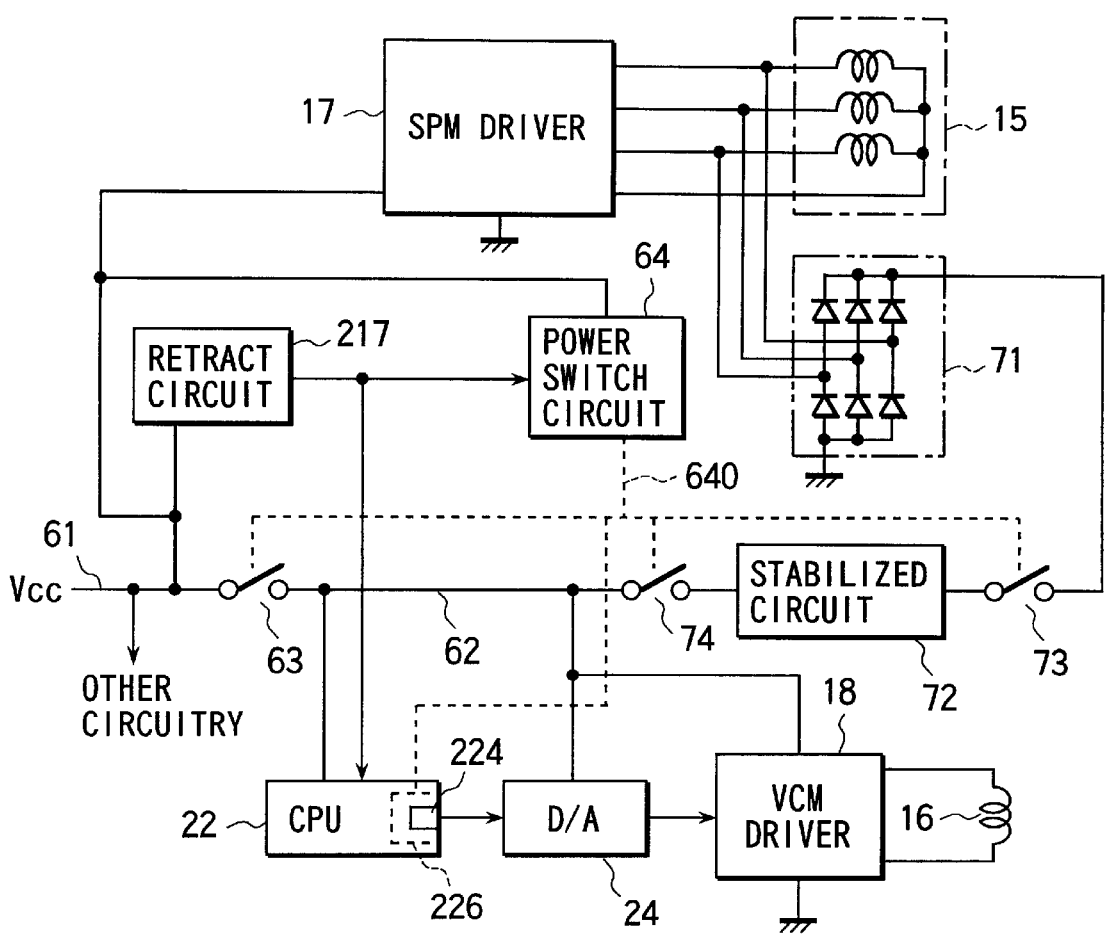
FIG. 17 is a block diagram illustrating the third type of a reserve power supply for use in the second embodiment.

FIG. 17 shows the third type of a reserve power supply for use in the second embodiment. The components identical to those shown in FIG. 15 are designated at the same reference numerals.

As shown in FIG. 17, the CPU 22 has a section 226 that operates at a lower voltage than any other section, to perform unloading control. The section 226 dedicated to the unloading control includes the SI 224. The section 226 further includes an operation circuit, a timer circuit, an A/D converter, and the like, which are not shown in FIG. 17.

When the application of power-supply voltage Vcc is interrupted, the interruption is detected by the retract circuit 217. The retract circuit 217 generates a signal that shows that the application of power-supply voltage Vcc has been interrupted. The signal is supplied to the CPU 22 and the power switch circuit 64, in response to which the switch circuit 64 changes the level of the switch control signal 640, from the high level to the low level. The signal 640 at the low level sets the CPU 22 in a low-voltage operating mode. In the low-voltage operating mode, only the section 226 operate. That is, only the section 226 operates during the interruption of the application of power-supply voltage Vcc to retract the head 12. Hence, the section 226 need not have an A/D converter.

Since only the section 226 operates during the interruption of the application of power-supply voltage Vcc, power can be saved unlike in the case where the entire CPU 22 operates to accomplish the unloading control during the interruption of the application of power-supply voltage Vcc.

Figure 21:
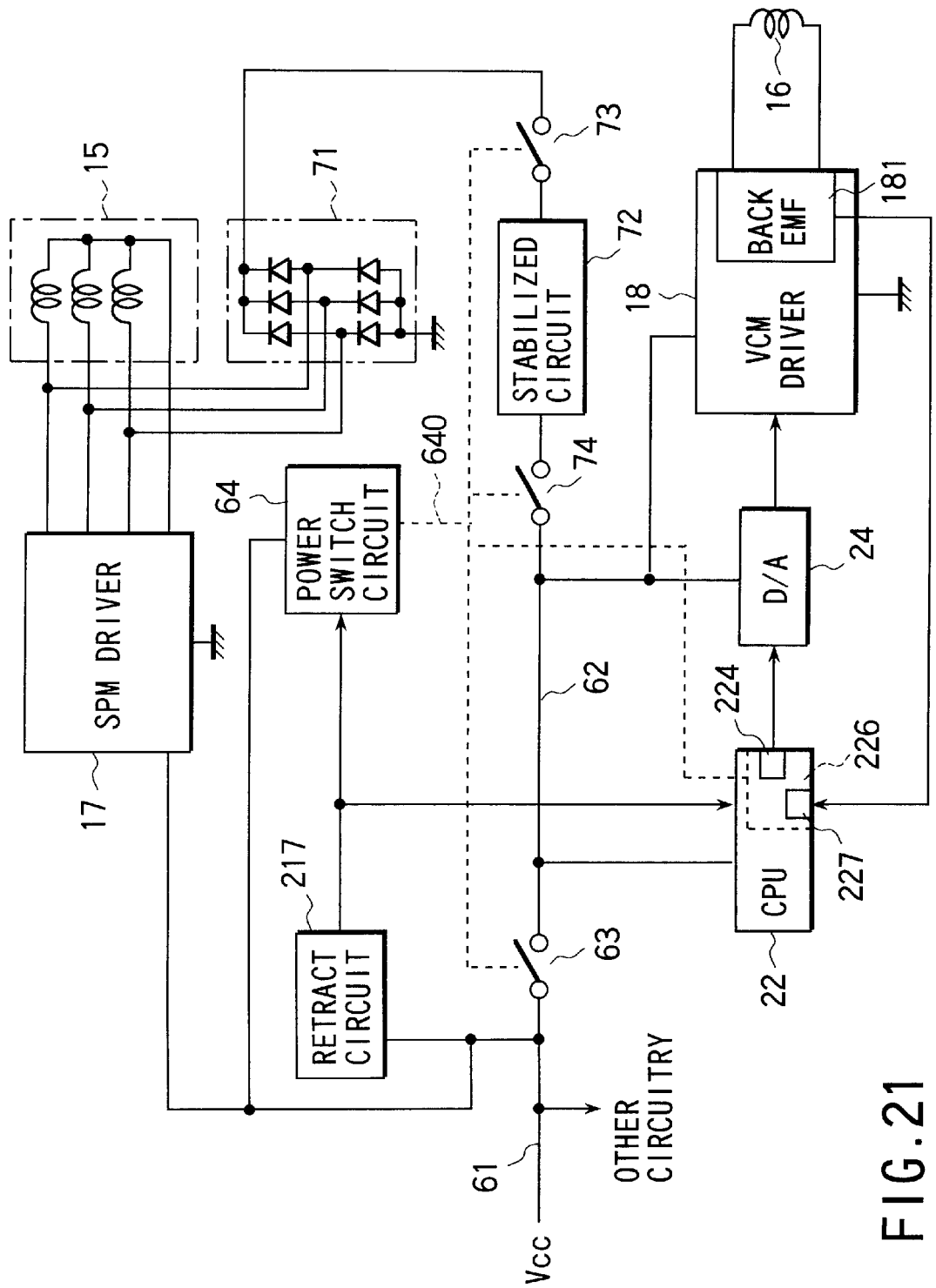
FIG. 21 is a block diagram illustrating a modification of the reserve power supply of the third type.

FIG. 21 depicts a modification of the third-type reserve power supply shown in FIG. 17. The modified reserve power supply is characterized in that the VCM driver 18 incorporates a back EMF detecting circuit 181, as in the modification (FIG. 20) of the second-type reserve power supply of FIG. 16. The section 226 of the CPU 22 includes an A/D converter 227. Therefore, the CPU 22 can perform feedback control on the basis of the output of the back EMF detecting circuit 181. The section 226 receives the output of the back EMF detecting circuit 181 through the A/D converter 277. The section 226 then repeatedly performs feedback control on the VCM 16 via the VCM driver 18 at regular intervals, so that the head 12 may be moved at a constant speed.

Reserve Power Supply of the Fourth Type

Figure 18:
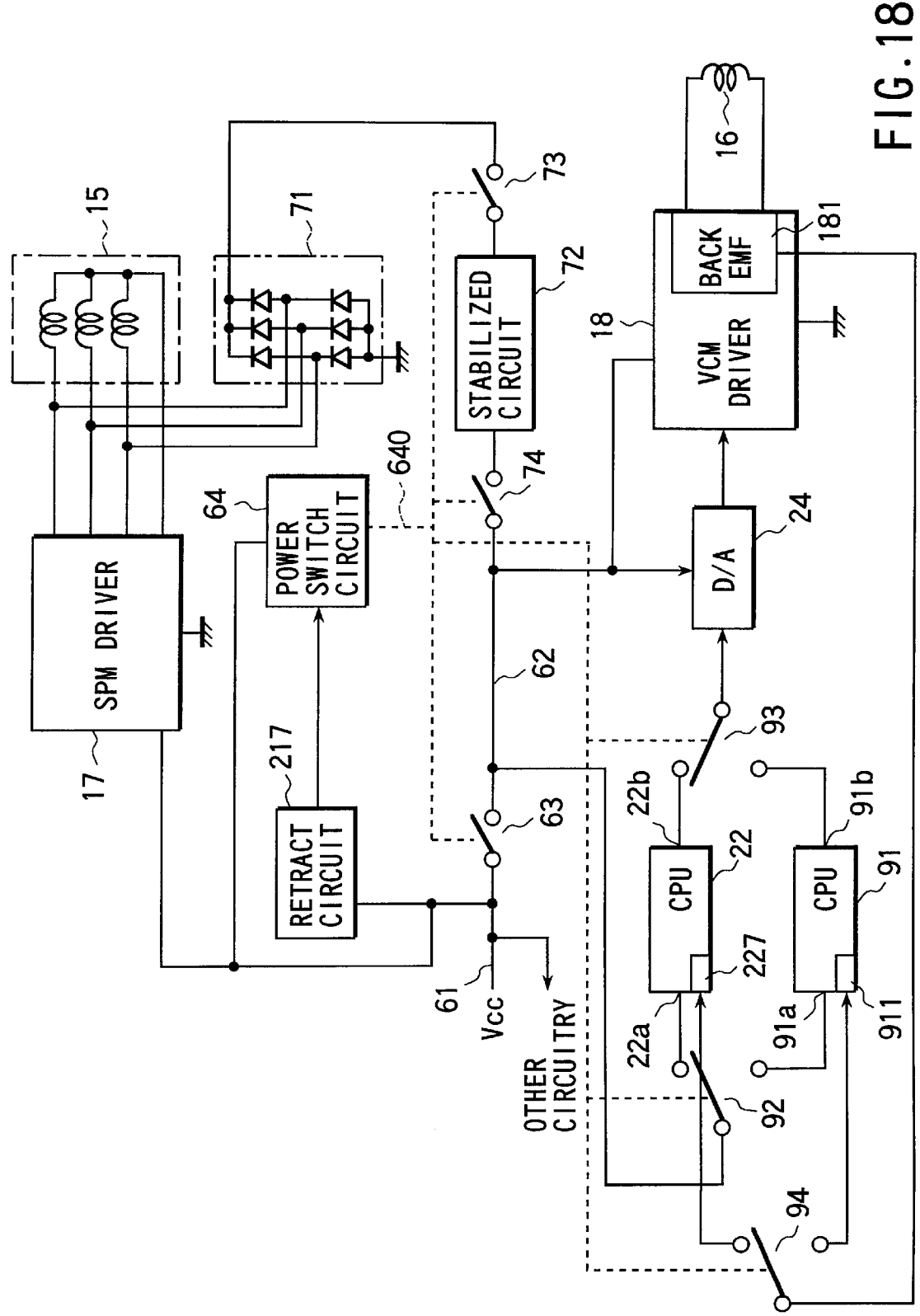
FIG. 18 is a block diagram showing the fourth type of a reserve power supply for use in the second embodiment.

FIG. 18 shows the third type of a reserve power supply for use in the second embodiment. The components identical to those shown in FIG. 16 are designated at the same reference numerals.

As shown in FIG. 18, a CPU 91 is provided in addition to the CPU 22. The CPU 91 is driven at a low voltage to perform unloading control when the supply of power from the main power supply is interrupted. The CPU 91 incorporates an A/D converter 911 and is dedicated to the unloading control, which should be effected to retract the head 12 to the ramp 14. The VCM driver 18 incorporates a back EMF detecting circuit 181.

Further, a switch 92 is provided between the second power supply line 62 on the one hand and the CPUs 22 and 91 on the other. The switch 92 is a semiconductor element such as an FET. The switch 92 connects the power-supply voltage terminal 22a of the CPU 22 or the power-supply voltage terminal 91a of the low-voltage CPU 91 to the second power supply line 62, in accordance with a switch control signal 640 supplied from the power switch circuit 64. When the switch control signal 640 is at high level during the normal operation of the disk drive, the switch 92 connects the power-supply terminal 22a of the CPU 22 to the second power-supply line 62. Conversely, when the switch control signal 640 is at low level during the interruption of the application of power-supply voltage Vcc, the switch 92 connects the power-supply terminal 91a of the CPU 91 to the second power-supply line 62.

Still further, a switch 93 is provided between the D/A converter 24 on the one hand and the serial interface outputs 22b and 91 of the CPUs 22 and 91 on the other hand. The switch 93 is an semiconductor element, too, such as an FET. The switch 93 connects the input of the D/A converter 24 to the serial interface output 22b of the CPU 22 or the serial interface output 91b of the CPU 91, in accordance with a switch control signal 640 supplied from the power switch circuit 64. When the switch control signal 640 is at high level during the normal operation of the disk drive, the switch 93 connects the input of the D/A converter 24 to the serial interface output 22b of the CPU 22. Conversely, when the switch control signal 640 is at low level during the interruption of the application of power-supply voltage Vcc, the switch 93 connects the input of the A/D converter 24 to the serial interface output 91b of the CPU 91.

Moreover, a switch 94 is provided between the output of the back EMF detecting circuit 181 on the one hand and the input of the A/D converter 227 and the A/D converter 911, which are incorporated in the CPU 22 and the low-voltage CPU 91, respectively. The switch 94 is an semiconductor element, too, such as an FET. The switch 94 connects the output of the back EMF detecting circuit 181 to the input of the D/A converter 227 or the A/D converter 911, in accordance with a switch control signal 640 supplied from the power switch circuit 64. When the switch control signal 640 is at high level during the normal operation of the disk drive, the switch 94 connects the output of the back EMF detecting circuit 181 to the input of the D/A converter 227. Conversely, when the switch control signal 640 is at low level during the interruption of the application of power-supply voltage Vcc, the switch 94 connects the output of the back EMF detecting circuit 181 to the input of the A/D converter 911.

While the disk drive is applied with the power from the main power supply and is operating normally, the power-supply voltage Vcc is applied from the second power supply line 62 to the CPU 221 through the switch 92. The CPU 22 therefore operates, outputting the control value from the serial interface output 22b during the servo control. The control value output from the serial interface output 22b is supplied to the D/A converter 24 through the switch 93. The D/A converter 24 converts the control value (digital value) to a control voltage (analog value), which is applied to the VCM driver 18. The VCM driver 18 generates a drive current from the control voltage. The drive current is supplied to the VCM 16, which drives the actuator 13. The head 12 is thereby moved to the target track on the disk 11.

When the retract circuit 217 detects an interruption of the application of power-supply voltage Vcc, the switch circuit 64 changes the level of the switch control signal 640, from the high level to the low level. The signal 640 turns the switches 92 to 94 on. The second power supply line 62 is thereby disconnected from the power-supply terminal 22a of the CPU 22 and connected to the power-supply terminal 91a of the CPU 91. At the same time, the input of the D/A converter 24 is disconnected from the serial interface output 22b of the CPU 22 and connected to the serial interface output 91b of the CPU 91. Further, the output of the output of the back EMF detecting circuit 181 is disconnected from the input of the A/D converter 227 provided in the CPU 22 and connected to the input of the A/C converter 911 provided in the low-voltage CPU 91. At the same time, the switches 63, 73 and 74 are changed over, whereby the power-supply voltage generated from the back EMF of the SPM 15 is applied from the power-stabilizing circuit 72 to the second power supply line 62.

As a result, the power-supply voltage is applied to the power-supply terminal 91a of the low-voltage CPU 91 through the second power supply line 62 and the switch 92. The CPU 91 operates, performing the prescribed unloading control to retract the head 12 to the ramp 14. The low-voltage CPU 91 receives the output of the back EMF detecting circuit 181 through the switch 94 and the A/D converter 227 incorporated in the CPU 91. In accordance with the output of the circuit 181 (i.e., the back EMF that is proportional to the speed with which the VCM 16 drives the actuator 13), the CPU 91 repeatedly performs feedback control on the VCM 16 via the VCM driver 18 at regular intervals, so that the head 12 may be moved at a constant speed.

The low-voltage CPU 91 may perform unloading control in the same way as the CPU 22. In this case, however, means must be provided to store data items representing the control voltage value set by the CPU 22, the present position of the head 12 and the fact that the head 12 is held at the unload area 110, so that the data items may be supplied to the low-voltage CPU 91 when necessary. Such means is a storage device such as a RAM or registers, into which the data items can be written from the CPU 22 and from which the data items can be read to the low-voltage CPU 91.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for retracting a head from a disk surface on power down in a disk drive, comprising:
   actuator means supporting the head and designed to move the head from a retraction position to a prescribed area on the disk:
   reserve power means provided apart from a main power supply to the disk drive, for supplying a drive current to the actuator means when supply of power from the main power supply is interrupted;
   retract means for calculating a distance for which the head is to be moved to the retract position, from a present position of the head, when supply of power from the main power supply is interrupted, and for determining a control value corresponding to the distance calculated;
   control means for controlling the drive current supplied from the reserve power means to move the head to the retract position in accordance with the control value which is determined by the retract means and is a constant value during the head movement; and
   a control capacitor for converting the control value to a control voltage, and in which the actuator means has a motor and the control means has a current circuit connected to the control capacitor and the motor, for controlling the drive current in accordance with the control voltage held in the control capacitor.

2. A disk drive having a head that reads data from a disk and writes data on the disk, comprising:
   an actuator having a support member supporting the head and a voice coil motor for moving the head from a retract position to a prescribed area on the disk;
   a spindle motor for rotating the disk;
   a main power supply for supplying a drive current to the voice coil motor and the spindle motor;
   a reserve power supply charged by means of the main power supply, for supplying a drive current to the voice coil motor when supply of power from the main power supply is interrupted;
   first retract control means for calculating a distance the bead is to be moved to the retract position, from a present position of the head, when supply of power from the main power supply is interrupted, and for determining a control value corresponding to the distance calculated; and second retract control means for disconnecting the main power supply from the voice coil motor and connecting the reserve power supply thereto when the supply of power from the main power supply is interrupted, and for controlling the drive current in accordance with the control value which is determined by the first retract control means and is a constant value during the head movement, thereby to move the head to the retract position;

wherein the second retract control means has a current circuit, a switch and a control capacitor for converting the control value to a control voltage, the current circuit controls the drive current supplied from the reserve power supply, in accordance with the control voltage, and the switch disconnects the main power supply from the voice coil motor and connects the reserve power supply to the current circuit and the voice coil motor when the supply of power from the main power supply is interrupted.

3. A disk drive having a head that reads data from a disk and writes data on the disk, comprising:

an actuator having a support member supporting the head, and a voice coil motor for moving the head from a retract position to a prescribed area on the disk;

a spindle motor for rotating the disk;

a main power supply for supplying a drive current to the voice coil motor and the spindle motor;

a reserve power supply for rectifying a back electromotive force that the spindle motor generates while being driven and for supplying a drive current to the voice coil motor when supply of power from the main power supply is interrupted;

first retract control means for calculating a distance the bead is to be moved to the retract position, from a present position of the head, when supply of power from the main power supply is interrupted, and for determining a control value corresponding to the distance calculated; and second retract control means for disconnecting the main power supply from the voice coil motor and connecting the reserve power supply thereto when the supply of power from the main power supply is interrupted, and for controlling the drive current in accordance with the control value which is determined by the first retract control means and is a constant value during the head movement, thereby to move the head to the retract position;

wherein the second react control means has a current circuit, a switch and a control capacitor for converting the control value to a control voltage, the current circuit controls the drive current supplied from the reserve power supply, in accordance with the control voltage, and the switch disconnects the main power supply from the voice coil motor and connects the reserve power supply to the current circuit and the voice coil motor when the supply of power from the main power supply is interrupted.

4. A disk drive having a head that reads data from a disk and writes data on the disk, comprising:

an actuator having a support member supporting the head, and a voice coil motor for moving the head from a retract position to a prescribed area on the disk;

a spindle motor for rotating the disk;

a main power supply for supplying a drive current to the voice coil motor and the spindle motor;

a reserve power supply for supplying a drive current to the voice coil motor when supply of power from the main power supply is interrupted;

detecting means for detecting whether the supply of power from the main power supply has been interrupted; and control means for performing normal control by using the main power supply and for performing unloading control by supplying the voice coil motor with a drive current which corresponds to a distance between the retract position and a position that the head takes above a surface of the disk, wherein the reserve power supply comprises a rectifier circuit for rectifying an AC voltage derived from a back electromotive force generated as the spindle motor is driven, and a power supply stabilizing circuit for stabilizing a DC voltage output by the rectifier circuit, the disk drive further comprising:

a first power supply line for supplying power from the main power supply to other components of the disk drive;

a second power supply line connected to the reserve power supply and to the first power supply line by a first switch;

a second switch for connecting an output of the power supply stabilizing circuit to the second power supply line and disconnecting the same from the second power supply line;

a third switch for connecting an output of the rectifier circuit to an input of the power supply stabilizing circuit and disconnecting the same from the output of the power supply stabilizing circuit; and means for controlling the third switch to disconnect the first and second power supply lines from each other, connecting the output of the power supply stabilizing circuit to the second power supply line, thereby to supply power from the reserve power supply through the second power supply line, when the detecting means detects that the supply of power from the main power supply has been interrupted.

5. A disk drive having a head that reads data from a disk and writes data on the disk, comprising:

an actuator having a support member supporting the head, and a voice coil motor for moving the head from a retract position to a prescribed area on the disk;

a spindle motor for rotating the disk;

a main power supply for supplying a drive current to the voice coil motor and the spindle motor;

a reserve power supply for supplying a drive current to the voice coil motor when supply of power from the main power supply is interrupted;

detecting means for detecting whether the supply of power from the main power supply has been interrupted;

control means for performing normal control by using the main power supply and for performing unloading control by supplying the voice coil motor with a drive current which corresponds to a distance between the retract position and a position that the head takes above a surface of the disk, the control means including a first microprocessor (CPU) for performing normal control while power is supplied from the main power supply, and a second microprocessor (CPU) for receiving power from the reserve power supply and performing unload control when supply of power from the main power supply is interrupted, said second microprocessor operating at a lower voltage than the first microprocessor;

a first power supply line for supplying power from the main power supply to other components of the disk drive;

a second power supply line connected to the reserve power supply and to the first power supply line by a first switch;

a second switch for connecting the second power supply line to the first microprocessor or the second microprocessor; and means for controlling the second switch to connect the second power supply line to the first microprocessor while power is supplied from the main power supply, and for controlling the first and second switches to disconnect the first and second power supply lines from each other and connect the second power supply line to the second microprocessor when the detecting means detects that the supply of power from the main power supply has been interrupted.

6. An apparatus for retracting a head from a disk surface on power down in a disk drive, comprising:

actuator means supporting the head and designed to move the head from a retraction position to a prescribed area on the disk;

reserve power means provided apart from a main power supply to the disk drive, for supplying a drive current to the actuator means when supply of power from the main power supply is interrupted;

retract means for calculating a distance for which the head is to be moved to the retract position, from a present position of the head, when supply of power from the main power supply is interrupted, and for determining a control value corresponding to the distance calculated; and control means for controlling the drive current supplied form the reserve power means to move the head to the retract position in accordance with the control value which is determined by the retract means and is a constant value during the head movement, wherein the retract means includes a CPU for performing normal control by using the main power supply, the CPU calculating the control value and setting the control value in a control capacitor while performing the normal control and the control means controls the drive current in accordance with the control value set in the control capacitor.

7. A disk drive having a head that reads data from a disk and writes data on the disk, comprising:

an actuator having a support member supporting the bead, and a voice coil motor for moving the bead from a retract position to a prescribed area on the disk;

a spindle motor for rotating the disk;

a main power supply for supplying a drive current to the voice coil motor and the spindle motor, a reserve power supply charged by means of the main power supply, for supplying a drive current to the voice coil motor when supply of power from the main power supply is interrupted;

first retract control means for calculating a distance the head is to be moved to the retract position, from a present position of the head, when supply of power from the main power supply is interrupted, and for determining a control value corresponding to the distance calculated; and second retract control means for disconnecting the main power supply from the voice coil motor and connecting the reserve power supply thereto when the supply of power from the main power supply is interrupted, and for controlling the drive current in accordance with the control value which is determined by the first retract control means and is a constant value during the head movement, thereby to move the head to the retract position;

wherein the first retract control means includes a CPU for performing normal control by using the main power supply, the CPU calculating the control value and setting the control value in a control capacitor while performing the normal control, and the second retract control means controls the drive current in accordance with the control value set in the control capacitor.

8. A disk drive having a head that reads data from a disk and writes data on the disk, comprising:

an actuator having a support member supporting the head, and a voice coil motor for moving the head from a retract position to a prescribed area on the disk;

a spindle motor for rotating the disk;

a main power supply for supplying a drive current to the voice coil motor and the spindle motor;

a reserve power supply for rectifying a back electromotive force that the spindle motor generates while being driven and for supplying a drive current to the voice coil motor when supply of power from the main power supply is interrupted;

first retract control means for calculating a distance the head is to be moved to the retract position, from a present position of the head, when supply of power from the main power supply is interrupted, and for determining a control value corresponding to the distance calculated; and second retract control means for disconnecting the main power supply from the voice coil motor and connecting the reserve power supply thereto when the supply of power from the main power supply is interrupted and for controlling the drive current in accordance with the control value which is determined by the first retract control means and is a constant value during the bead movement, thereby to move the head to the retract position;

wherein the first retract control means includes a CPU for performing normal control by using the main power supply, the CPU calculating the control value and setting the control value in a control capacitor while performing the normal control, and the second retract control means controls the drive current in accordance with the control value set in the control capacitor.

* * * * *